United States Patent
Todd et al.

(10) Patent No.: US 7,565,494 B1
(45) Date of Patent: **\*Jul. 21, 2009**

(54) CONFIGURING A BOUNDED CACHE PREFETCH POLICY IN A COMPUTER SYSTEM EMPLOYING OBJECT ADDRESSABLE STORAGE

(75) Inventors: Stephen J. Todd, Shrewsbury, MA (US); Michael Kilian, Harvard, MA (US); Tom Teugels, Schoten (BE); Jan F. Van Riel, Geel (BE)

(73) Assignee: EMC Corporation, Hopkinton, MA (US)

( * ) Notice: Subject to any disclaimer, the term of this patent is extended or adjusted under 35 U.S.C. 154(b) by 353 days.

This patent is subject to a terminal disclaimer.

(21) Appl. No.: 11/519,391

(22) Filed: Sep. 12, 2006

(51) Int. Cl.
*G06F 12/08* (2006.01)
(52) U.S. Cl. .................. 711/137; 711/133; 709/221
(58) Field of Classification Search ............... 711/118, 711/154, 137, 170, 156, 133; 709/221, 226, 709/217, 218, 216, 214, 215
See application file for complete search history.

(56) References Cited

U.S. PATENT DOCUMENTS

| 6,728,840 | B1 * | 4/2004 | Shatil et al. | 711/137 |
| 6,985,999 | B2 * | 1/2006 | Henry et al. | 711/118 |
| 7,389,330 | B2 * | 6/2008 | Dillon et al. | 709/219 |
| 2003/0135411 | A1 * | 7/2003 | Ushiki et al. | 709/246 |
| 2003/0187984 | A1 * | 10/2003 | Banavar et al. | 709/225 |
| 2004/0205149 | A1 * | 10/2004 | Dillon et al. | 709/217 |

OTHER PUBLICATIONS

Venkata et al., "Using Predictive Prefetching to Improve World Wide Web Latency," Computer Communication Review, 1996, 26(3):22-36.*
Kroeger et al., "Exploring the Bounds of Web Latency Reduction from Caching and Prefetching. In Proc." Symposium on Internet Technologies and Systems, pp. 13-22. USENIX, Monterey, CA, Dec. 1997.*
U.S. Appl. No. 11/519,374, filed Sep. 12, 2006, Stephen J. Todd, et al.
U.S. Appl. No. 11/519,950, filed Sep. 12, 2006, Stephen J. Todd, et al.
U.S. Appl. No. 11/519,373, filed Sep. 12, 2006, Stephen J. Todd, et al.
U.S. Appl. No. 11/519,390, filed Sep. 12, 2006, Stephen J. Todd, et al.
U.S. Appl. No. 11/519,948, filed Sep. 12, 2006, Stephen J. Todd, et al.

* cited by examiner

*Primary Examiner*—Pierre-Michel Bataille
(74) *Attorney, Agent, or Firm*—Krishnendu Gupta; Penelope S. Wilson

(57) ABSTRACT

Caching techniques for use in a computer system comprising a core and at least one edge device. The core comprises at least one object addressable storage system. At least one cache is disposed logically between the core and the edge device. The cache has a prefetch policy that selects from among the content units based upon at least one prefetch criterion. The prefetch policy imposes a limit on at least one prefetch operation. The limit is selected from the group consisting of: a total number of content units to be prefetched; a time range during which content units were stored to qualify as prefetch candidates; and a total volume of content to be prefetched.

20 Claims, 10 Drawing Sheets

CONFIGURING A BOUNDED CACHE PREFETCH POLICY IN A COMPUTER SYSTEM EMPLOYING OBJECT ADDRESSABLE STORAGE

FIELD OF INVENTION

The present application relates to computer systems employing object addressable storage.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY OF INVENTION

One embodiment is directed to a method for use in a computer system comprising a core and at least one edge device, the core comprising at least one object addressable storage system that stores a plurality of content units thereon and provides an object addressable interface that enables content units to be accessed via object identifiers, the at least one edge device being configured to access at least some of the plurality of content units. The method comprises acts of: (A) configuring at least one cache to be disposed logically between the core and the at least one edge device and to temporarily store a subset of the plurality of content units; and (B) configuring the at least one cache to have a limit on a maximum number of content units that can be stored on the at least one cache simultaneously. Another embodiment is directed to a computer readable medium encoded with a plurality of instructions for performing the method.

Another embodiment is directed to a cache for use in a computer system comprising a core and at least one edge device, the core comprising at least one object addressable storage system that stores a plurality of content units thereon and provides an object addressable interface that enables content units to be accessed via object identifiers, the at least one edge device being configured to access at least some of the plurality of content units, the cache to be disposed logically between the core and the at least one edge device. The cache comprises at least one storage medium to store a subset of the plurality of content units; and at least one controller to configure the at least one cache to have a limit on a maximum number of content units that can be stored on the at least one cache simultaneously.

A further embodiment is directed to a method for use in a computer system comprising a core and at least one edge device, the core comprising at least one object addressable storage system that stores a plurality of content units thereon and provides an object addressable interface that enables content units to be accessed via object identifiers, the at least one edge device being configured to access at least some of the plurality of content units. The method comprises acts of: (A) configuring at least one cache to be disposed logically between the core and the at least one edge device and to temporarily store a subset of the plurality of content units; and (B) configuring the at least one cache to have a replacement policy that, when at least one of the subset of the plurality of content units is to be replaced in the at least one cache, selects from among the subset of the plurality of content units at least one selected content unit to be replaced by evaluating at least some of the subset of the plurality of content units as candidates for replacement based upon at least one replacement criterion. The at least one replacement criterion being selected from the group consisting of: an identity of a source that wrote an evaluated content unit to the computer system; when the replacement is performed subsequent to a request to access at least one of the plurality of content units stored on the core, an identity of a requestor that issued the request; a size of an evaluated content unit; a content type of an evaluated content unit; and when metadata was written to the computer system along with an evaluated content unit, the substance of the metadata. Another embodiment is directed to a computer readable medium encoded with a plurality of instructions for performing the method, and a further embodiment is directed to a cache having at least one controller to configure the cache to have the replacement policy.

A further embodiment is directed to a method for use in a computer system comprising a core and at least one edge device, the core comprising at least one OAS system that stores a plurality of content units thereon and provides an object addressable interface that enables content units to be accessed via object identifiers. The method comprises acts of: (A) configuring at least one cache to be disposed logically between the core and the at least one edge device and to temporarily store a subset of the plurality of content units; and (B) configuring the computer system to have a prefetch policy that selects, from among the plurality of content units, at least one selected content unit to be prefetched to the at least one cache, the prefetch policy evaluating at least some of the plurality of content units as candidates for prefetching based upon at least one prefetch criterion. The at least one prefetch policy is selected from the group consisting of: an identity of a source that wrote an evaluated content unit to the computer system; a size of an evaluated content unit; a content type of an evaluated content unit; when the prefetch is performed subsequent to a request to access at least one of the plurality of content units stored on the core, an identity of a requestor that issued the request; when the prefetch is performed subsequent to a request to access at least one of the plurality of content units stored to the computer system at a first time, proximity of a time at which an evaluated content unit was stored to the computer system relative to the first time; and when metadata was written to the computer system along with the evaluated content unit, the substance of the metadata. Another embodiment is directed to at least one computer readable medium encoded with a plurality of instructions that, when executed, perform the method.

Another embodiment is directed to at least one computer for use in a computer system comprising a core, at least one cache and at least one edge device. The core comprises at least one OAS system that stores a plurality of content units thereon and provides an object addressable interface that enables content units to be accessed via object identifiers. The at least one computer comprises at least one processor programmed to implement a prefetch policy that selects, from among a plurality of content units on the core, at least one selected content unit to be prefetched to the at least one cache. The prefetch policy evaluating at least some of the plurality of content units as candidates for prefetching based upon at least one prefetch criterion that is selected from the group consisting of: an identity of a source that wrote an evaluated content unit to the computer system; a size of an evaluated content unit; a content type of an evaluated content unit; when the prefetch is performed subsequent to a request to access at least one of the plurality of content units stored on the core, an identity of a requestor that issued the request; when the prefetch is performed subsequent to a request to access at least one of the plurality of content units stored to the computer system at a first time, proximity of a time at which an evaluated content unit was stored to the computer system relative to the first time; and when metadata was written to the computer system along with the evaluated content unit, the substance of the metadata.

A further embodiment is directed to a method for use in a computer system comprising a core comprising at least one object addressable storage system that stores a plurality of content units thereon and provides an object addressable interface that enables content units to be accessed via object identifiers, at least one edge device configured to access at least some of the plurality of content units, and at least one cache disposed logically between the core and the at least one edge device and configured to temporarily store a subset of the plurality of content units. The at least one cache has a prefetch policy that evaluates at least some of the plurality of content units as candidates for prefetching based upon at least one prefetch criterion. The method comprises an act of configuring the at least one object addressable storage system to organize the plurality of content units stored thereon in groups that are arranged according to the at least one prefetch criterion. Another embodiment is directed to at least one computer readable medium encoded with a plurality of instructions that, when executed, perform the method.

Another embodiment is directed to at least one object addressable storage (OAS) system for use in a computer system. The computer system comprises a core comprising the at least one OAS system to store a plurality of content units thereon, at least one edge device configured to access at least some of the plurality of content units, and at least one cache disposed logically between the core and the at least one edge device and configured to temporarily store a subset of the plurality of content units. The at least one cache has a prefetch policy that evaluates at least some of the plurality of content units as candidates for prefetching based upon at least one prefetch criterion. The at least one OAS system comprises: at least one storage medium to store the plurality of content units; and at least one processor programmed to provide an object addressable interface and to configure the at least one object addressable storage system to organize the plurality of content units stored thereon in groups that are arranged according to the at least one prefetch criterion.

A further embodiment is directed to a method for use in a computer system comprising a core, at least one cache and at least one edge device. The method comprises an act of configuring the computer system to have a prefetch policy that imposes a limit on at least one prefetch operation. The limit is selected from the group consisting of: a total number of content units to be prefetched during the at least one prefetch operation; a time range during which the at least some of the plurality of content units were stored to the computer system to qualify them as candidates for being prefetched during the at least one prefetch operation; and a total volume of content included in the prefetched content units during the at least one prefetch operation. Another embodiment is directed to at least one computer readable medium encoded with a plurality of instructions that, when executed, perform the method.

A further embodiment is directed to at least one computer for use in a computer system comprising a core, at least one cache and at least one edge device. The at least one computer comprises at least one processor programmed to implement a prefetch policy. The prefetch policy imposes a limit on at least one prefetch operation. The limit is selected from the group consisting of: a total number of content units to be prefetched during the at least one prefetch operation; a time range during which the at least some of the plurality of content units were stored to the computer system to qualify them as candidates for being prefetched during the at least one prefetch operation; and a total volume of content included in the prefetched content units during the at least one prefetch operation.

Another embodiment is directed to a method for use in a computer system comprising a core, at least one cache and at least one edge device. The core comprises at least one object addressable storage system that stores a plurality of content units. The method comprises acts of: (A) configuring the computer system to have a prefetch policy that selects, from among the plurality of content units, at least one selected content unit to be prefetched to the at least one cache, the prefetch policy evaluating at least some of the plurality of content units as candidates for prefetching based upon at least one prefetch criterion; and (B) configuring the computer system to enable or disable prefetching in response to at least one criterion based upon information associated with an individual access request requesting access to at least one of the plurality of content units. A further embodiment is directed to at least one computer readable medium encoded with a plurality of instructions that, when executed, perform the method.

A further embodiment is directed to at least one computer for use in a computer system comprising a core, at least one cache and at least one edge device. The core comprising at least one object addressable storage system that stores a plurality of content units thereon. The at least one computer comprises at least one processor programmed to configure the computer system to have a prefetch policy, and to enable or disable prefetching in response to at least one criterion based upon information associated with an individual access request requesting access to at least one of the plurality of content units.

Another embodiment is directed to a method for use in a computer system comprising a core, at least one cache and at least one edge device, the core comprising at least one object addressable storage system that stores a plurality of content units thereon and provides an object addressable interface that enables content units to be accessed via object identifiers. The at least one edge device is configured to access at least some of the plurality of content units. The at least one cache is disposed logically between the core and the at least one edge device and configured to temporarily store a subset of the plurality of content units. The method comprises an act of: (A) configuring the computer system to have a cache staging policy that controls the staging of a requested content unit from the core, wherein the staging policy devotes an amount of resources to searching for the requested content unit in the at least one cache before requesting that the requested content unit be staged from the core, wherein the amount of resources is dependent upon a size of the requested content unit.

DETAILED DESCRIPTION

Figure 1:
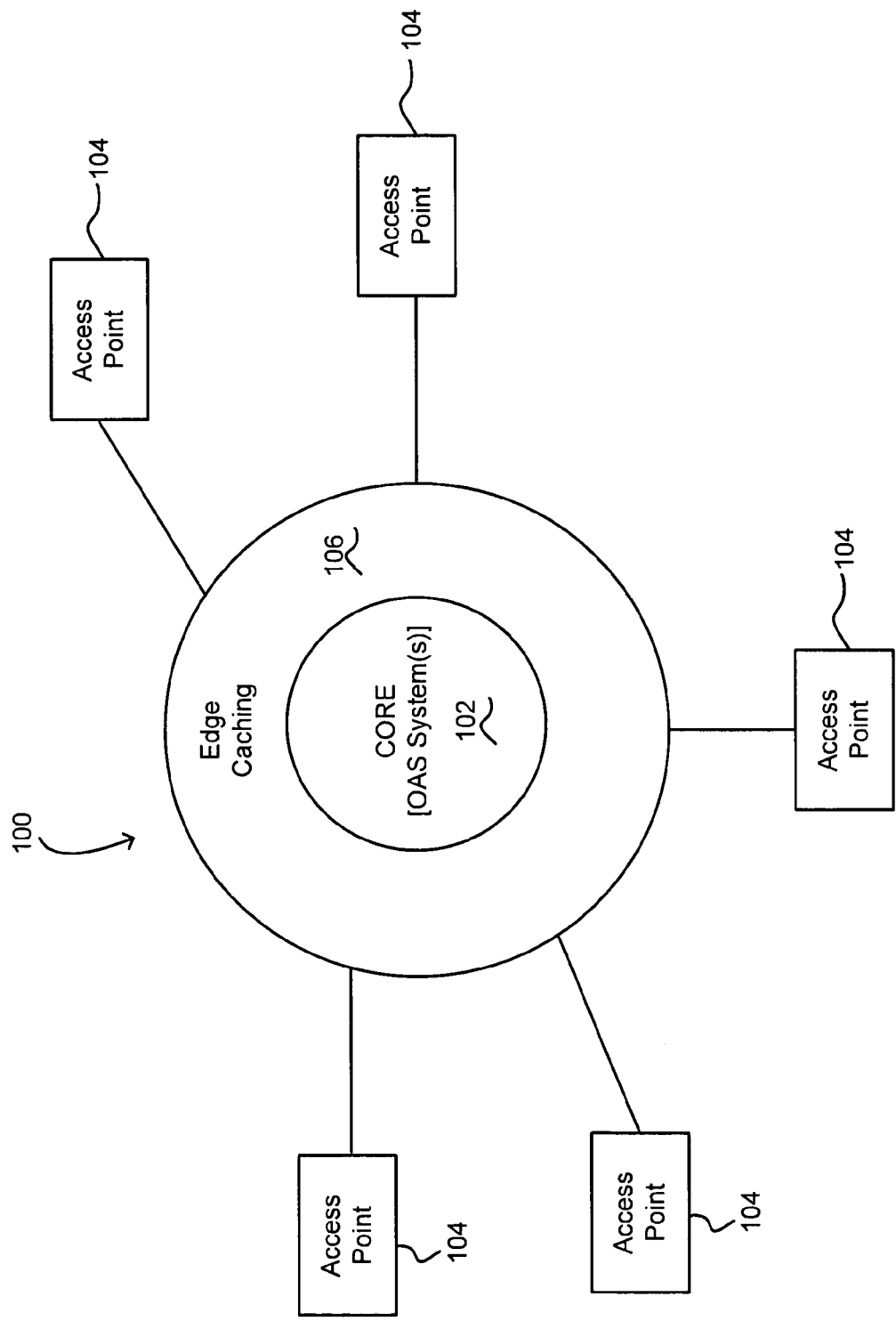
FIG. 1 is a conceptual illustration of a computer system implemented in accordance with the My World brokerage information concept, and which can employ one or more of the caching concepts of the present invention described herein.

Embodiments of the present invention are directed to caching content in a computer system that employs OAS. Applicants have appreciated that OAS systems and the ways in which they can be used provide unique challenges and opportunities for the caching of content. In one illustrative embodiment of the invention described below, the caching techniques of the present invention are described as being used in a unique information brokerage system built on OAS that is referred to as My World. However, it should be appreciated that the aspects of the present invention described herein are not limited in this respect, and that the caching techniques described herein can be employed with any computer system employing OAS.

In accordance with embodiment of the present invention, a cache is disposed logically between an end user device and an OAS system and the cache is configured to have a limit on a maximum number of content units that can be stored thereon simultaneously.

In accordance with another embodiment of the present invention, a cache is disposed logically between an end user device and an OAS and is configured with a replacement policy that evaluates content units as candidates for replacement based upon an identity of a source that wrote the evaluated content unit, the size of the evaluated content unit, the content type of the evaluated content unit, metadata written with the evaluated content unit and/or when the replacement is performed subsequent to a recent request to access a content unit, an identity of the requester.

In accordance with yet another embodiment of the present invention, a cache is disposed logically between an end user device and an OAS system and is configured with a prefetch policy that prefetches based upon prefetch criteria. Examples of the criteria upon which a prefetch policy can be based include, for each content unit on the OAS system evaluated to be prefetched, an identity of a source that wrote the evaluated content unit, a size of the evaluated content unit, a type of the evaluated content unit, metadata written to the OAS system along with the evaluated content unit, and/or when the prefetch is performed subsequent to a recent request to access a content unit, an identity of the requestor that issued the request and/or a proximity of time at which the evaluated content unit was stored relative to the requested content unit.

In accordance with another embodiment of the present invention, the OAS system is configured to organize the content units stored thereon in groups that are arranged according to the prefetch criteria to facilitate efficient prefetching of content units from the OAS system.

In accordance with a further embodiment of the present invention, limits are placed on a prefetch operation to limit what is prefetched at any particular time based upon one or more criterion. Examples of the criteria that can be used to limit a prefetch operation include a total number of content units to be prefetched during a prefetch operation, a time range during which the content units were stored to qualify them as candidates for being prefetched during the operation and/or a total volume of content included in the prefetched content units.

A further embodiment of the present invention is directed to a cache disposed logically between a user device and an OAS system and configured to have a prefetch policy, and wherein the system can enable and/or disable prefetching in response to an access request.

As discussed above, in one embodiment, the aspects of the present invention relating to caching content in a computer system employing an OAS system are described as being employed in a computer system implementing the My World information brokerage concept. However, it should be appreciated that the aspects of the present invention described herein are not limited in this respect, and can be employed to cache content in any computer system that employs content that is stored on an OAS system and accessed by one or more user devices. It should be appreciated that the caching concepts described below can be implemented as a single stage cache disposed between the user device(s) and the OAS system(s), or alternatively multiple stages of caching can be employed between the user device(s) and the OAS system(s).

I. The My World Information Brokerage System

My World is a concept relating to an information brokerage system built on a foundation of OAS systems to store information. The My World concept recognizes that our lives are continually involving more and more digital content that pervades numerous aspects of our lives. Examples include entertainment (e.g., music, video, etc.), communications (e.g., e-mail), health care (e.g., storing an individual's health records digitally), finance (e.g., online banking, investments, etc.) and photography. Increasingly, an individual is relying less upon a specific physical device to store his/her digital content (e.g., a home or business computer), and is relying upon online sources to store such content. Examples of such online services include online e-mail providers, online services for organizing and distributing photographs, online services for storing and distributing music and videos, online banking and online services for storing and organizing medical records. Much of this content is fixed, such that after the content is created it is not modified.

The My World information brokerage concept envisions a process of interaction between people and their information. In the examples described herein, much of this information relates to fixed content information. However, it should be appreciated that the My World information brokerage concept and the aspects of the present invention described herein are not limited in this respect, and can also be employed with content that is modifiable. In accordance with the My World information brokerage concept, all (or a majority) of an individual's content is stored (in a safe and secure manner) online, and is accessible to the user anywhere from any device, including mobile and wireless devices. The content is held indefinitely and can be shared with others. Users create, view, store and exchange content in a manner that is completely independent of any details about where or how the information is actually stored. From the user's perspective, the online experience is one wherein the network of intermediaries and information brokers are trusted, and the user may access this network using any desired device (e.g., a laptop, a cellular phone, a digital camera, an MP3 player, a digital video recorder, etc.). The user's experience is one that is organized in ways that make content searchable and easy to find, without the need to remember where it is physically stored. For example, according to the My World information brokerage concept, an individual may have entities such as My Family, My Doctor, My Lawyer, and My Bank, and work with objects within those entities such as My Music, My Pictures, My Medical Records, My Contracts, and My Financial Records.

The backbone of the My World information brokerage concept is the use of OAS systems to store the content for the users. OAS systems provide a number of advantages over other types of storage systems (e.g., block I/O storage systems) for this application. For example, an OAS system employs a user interface that enables content to be accessed via an object identifier that is independent of where the content is logically or physically stored. This characteristic of OAS systems is advantageous for the My World information brokerage concept, and any other system wherein it is desired to enable the user to access content units based solely upon the nature of the content (or metadata associated with it) and not based upon information specifying where the information is stored so that the storage location is transparent to the user.

In addition, the My World information brokerage concept envisions that more and more metadata increasingly may be associated with units of content (e.g., the date on which a photograph was taken, location information about where the photograph was taken, etc.), and that users should be able to locate content by searching for the associated metadata. As discussed in more detail below, OAS systems provide a convenient mechanism for associating metadata with content, and do so far more simply and efficiently than other types of storage architectures (e.g., block I/O storage systems or file system storage architectures).

Some examples will now be provided of the ways in which the My World information brokerage concept can be employed to manage various types of content online.

1. Financial Information

One example of information that can be brokered using the My World information brokerage concept is financial information. Increasingly, banking, insurance, and other financial institutions may desire to provide online services to individuals to manage their financial information while enabling the information to be captured, annotated and retained for extended periods of time. Much of the information may originate at the financial institution and can be viewed as a time series of events captured as fixed content records or documents (e.g., account transactions, mortgage contracts, insurance policies, etc.). The individual may wish to have access to this information for viewing or sharing and would like to think of that information as content belonging to the individual. The individual may wish the information to be stored in a way so that it is safe (e.g., can't be lost), secure (e.g., only the user or those to whom he/she grants access can view it) and accessible in the sense that the user can get access to it whenever and wherever the user desires. In addition, the user does not want to be concerned about where the information is physically stored, but would like it to be retrievable by attributes that the user can remember and/or search for. In accordance with the My World information brokerage concept, all of an individual's financial information can be stored in a core of one or more OAS systems as a set of content units that each is identified by an object identifier, and can be accessed by the user from the core via any device, including

2. Medical Information

Another example relates to medical information. Over the course of a lifetime, people build up a medical history that includes a collection of medical records (e.g., MRI pictures, x-rays, insurance documents) that may reside at various hospitals, doctors' offices and insurance companies, as well as perhaps at the individual's home, so that it may be a daunting task to assemble all of this information at any particular point in time.

In accordance with the My World information brokerage concept, the individual may be viewed as keeping this history in a logical sense, even though the actual content files may be stored on remote and distributed storage systems. For example, MRI images may be stored in archives at hospitals along with metadata associated with that content (e.g., in the form of annotations to the MRI images) that facilitate their use. According to the My World information brokerage concept, the actual OAS systems that store the medical information (e.g., at a hospital, an insurance company, a doctor's office, etc.) form part of the core of object addressable storage that is accessible to an individual, so that an individual can find all of his/her medical records simply by asking the core to provide the individual's medical records, or by searching for them using easily remembered search terms that can correlate to metadata associated with the content (e.g., find for me all of my MRI images).

3. Digital Pictures

Another example for use of the My World information brokerage concept relates to digital pictures. Today, digital cameras and camera phones with wireless capability are becoming more prevalent, and they often are used to render and play content. However, the complexity of storing and finding images hinders individuals. According to the My World information brokerage concept, individuals should be able to take pictures anywhere they are and look at them or share them with others wherever and whenever they want. In addition, they should be able to do this quickly and easily, without, for example, loading pictures onto a PC from the camera via a cable or memory card, determining a storage location on a home computer for the photos or uploading them to online photo albums.

In addition, according to the My World information brokerage concept, rather than finding pictures by remembering where they were stored, an individual can locate them simply by searching based upon attributes related to the pictures. In this respect, the content of the photos can be stored along with metadata relating to them. This metadata can take any of numerous forms, examples of which include the geographic location where the pictures were taken, an event at which they were taken and/or a time at which they were taken. The metadata can be generated manually or automatically. In this respect, ever advancing technology may enable more and more information to be automatically captured and stored as metadata associated with content. For example, future cameras may be equipped with electronic sensors that capture user identification information via biometric analysis (e.g., fingerprints or an iris), may capture date, time and location information via global positioning signals, and/or may add temperature or humidity information by direct sensing. Additional metadata for a photograph can include information that identifies the individuals in a photograph, with the identifying information being provided manually or automatically (e.g., by facial recognition software).

In accordance with the My World information brokerage concept, both the content (i.e., the images) and the metadata associated with it can be uploaded to the core automatically, without human intervention, and the user need not care (or even be aware) about where the objects are stored, but should be comforted that they are safe and secure and can be retrieved easily by simply asking the core for the individual's photos and/or searching the metadata associated with the images.

4. Music and Video

In another example, an individual may wish to find and play music and/or video to which the user has obtained digital rights, and may wish to do so independent of whatever device (s) are available to the user at any particular time to listen to the music or view the video. The individual may be home, in an airplane, hotel room, etc., and depending upon his/her location and the availability of various devices at that location, the individual may wish to choose a particular device on which to listen to music or view video. In accordance with the My World information brokerage concept, the individual may be able to drop a piece of content on any available device. This device can be a specialized device for listening to music or viewing video, or may be any other suitable device such as a laptop or a cellular phone.

5. E-Mail

E-mail typically spans an individual's work and private life, and a user may maintain multiple e-mail accounts for different purposes (e.g., a work account provided by an employer and a personal account on an online e-mail service). Nevertheless, in accordance with the My World information brokerage concept, the user may view all of it as his/her e-mail, and may have all his/her e-mail stored in the core in a safe and secure manner indefinitely. The e-mail can be searched much like searching for any content on the Internet today, and can be viewable and sharable using any suitable device.

6. Other Examples

The foregoing examples are provided solely for illustrative purposes, and it should be appreciated that numerous other types of content can be stored and organized in accordance with the My World information brokerage concept, including not only content types and associated metadata that can be generated by existing technologies, but also those that will be generated by yet to be developed technologies.

7. Summary of the My World Information Brokerage Concept

As should be appreciated from the foregoing, the My World information brokerage concept envisions services that manage content through the use of a virtual place that accumulates and stores content that is created by different applications and devices but owned by and related to an individual, and wherein a user's content is readily and securely retrievable by that individual from anywhere using any device. The user is provided with the comfort that his/her content will be retained indefinitely and cannot be lost, the simplicity of not having to manage where the content is stored, and the ability to retrieve it any time anywhere, and from any device.

It should be appreciated that some of the above-described features of the My World information brokerage concept are presently being performed today by various online services (e.g., e-mail services, photograph services, music and video services, medical records services, etc.). However, the My World information brokerage concept envisions a more expansive system. In addition, while it is not necessary to implement the My World information brokerage concept, in one embodiment the user may access his/her content through a common user interface and may be able to gain access to content without needing to authenticate and authorize the user to disparate services, thereby unifying the experience for the user.

II. The Use of OAS for Implementing the My World Concept

As mentioned above, OAS provides advantages for implementing a system such as that described above in connection with the My World information brokerage concept. Two characteristics that make OAS particularly well suited for this type of system include location independent storage and ease of associating metadata with content.

1. Location Independence

As discussed above, many storage architectures identify content using an identifier that may be tied to a physical and/or logical location at which the content is stored (e.g., a logical volume in a block I/O storage system and a directory or file in a file system). Conversely, in an OAS system, content may be identified using an object identifier that may be entirely independent of any logical and physical locations wherein the content is stored. As one of the goals of the My World information brokerage concept is to free the user from needing to remember where content is physically or logically stored, and to enable the core storage component(s) of the system to move content around if desired, the location independence of an OAS system is well suited for use in this environment.

2. Associating Metadata With Content

As should be appreciated from the foregoing discussion, one component of the My World information brokerage concept is to leverage metadata associated with content. Other types of storage architectures provide no convenient mechanism to associate metadata with content. For example, in a file system structure, if it was desired to associate metadata with a piece of content (e.g., a picture), a user typically needs to create a metadata file to hold the metadata associated with the content, create a directory that includes the metadata file and the content (e.g., the photo), and that arrangement within a common directory must be maintained. That is inefficient.

Many OAS systems are more conducive to easily and efficiently associating metadata with content. This can be done in various ways, and it should be appreciated that the aspects of the present invention described herein are not limited to use with an OAS system that associates metadata with content in any particular manner. One example of an OAS system that associates metadata with content is one that uses a content descriptor file (CDF)/blob architecture as described in a number of the applications listed below in Table 1. In accordance with the CDF/blob architecture, content can be stored in a blob and have an object identifier (e.g., a content address) associated with it, and a CDF created for the blob can include the object identifier for the blob as well as metadata associated with it. The CDF is independently accessible via its own object identifier. By accessing the CDF, the content in the blob can be efficiently and easily accessed (via its object identifier that is included in the CDF) along with its associated metadata.

Another example of a technique for associating metadata with content in an object addressable system is the eXtensible Access Method (XAM) proposal that is being developed jointly by members of the storage industry and is proposed as a standard. In accordance with XAM, an "XSET" can be defined to include one or more pieces of content and metadata associated with the content, and the XSET can be accessed using a single object identifier (referred to as an XUID). Taking the above example of the piece of content relating to a photograph, an XSET can be created and the photograph itself can be provided as a first "stream" to the XSET. One or more files (e.g., text files) can be created to include metadata relating to the photograph, and the metadata file(s) can be provided to the XSET as one or more additional streams. Once the XSET has been created, an XUID is created for it so that the content (e.g., the photograph) and its associated metadata can thereafter be accessed using the single object identifier (e.g., its XUID).

Again, it should be appreciated that the CDF/blob and XSET techniques for associating metadata with content are merely two examples of ways in which content can be associated with metadata in an OAS system, and that the aspects of the present invention described herein are not limited to use in a system that employs one of these or any other particular technique for associating metadata with content.

III. Accessing Content Through Edge Devices

As discussed above, the My World information brokerage concept envisions that individuals may be able to: (1) generate numerous types of content (including fixed content) using numerous types of edge devices; (2) have that content transferred from the edge devices to a core for storage; and (3) the user's content can later be retrieved using numerous types of edge devices, including devices of different types than those that generated the content being retrieved. The aspects of the present invention described herein are not limited to use with a system that employs any particular type of edge device(s), as the embodiments of the present invention described herein can be used with any device capable of generating and accessing content, including devices that exist today and those that have yet to be developed. Examples of edge devices include computers of all types, including laptops, PCs, cellular phones, programmable digital assistants (PDAs), digital cameras, digital video recorders, and music players (e.g., MP3 players), any of which can access the core through a wireless connection or any other type of communication medium.

When a content unit is generated by an edge device and presented to the core for storage, an object identifier may be generated for the content unit itself and/or for a larger entity (such as an XSET or a CDF) that includes the content unit and metadata associated with it. The aspects of the present invention described herein are not limited to use with a computer system that accomplishes this in any particular way. As one example, each device that generates a content unit and submits it for storage to the core can have the capability of generating an object identifier for the content unit and presenting it along with the content unit. Alternatively, an object identifier for the content unit can be generated by another component of the system to which the edge device passes the content unit for storage. The component of the system that generates the object identifier can form part of the core that stores the content, can be part of a caching layer that is disposed logically between the edge device(s) and the core, or can be elsewhere, as the aspects of the present invention described herein are not limited to a system that generates object identifiers in any particular way. In accordance with one embodiment, the aspects of the present invention described herein can be used in systems where the object identifier for a content unit is a content address generated by applying a hashing function (e.g., the MD5 algorithm or another) to all or part of the content unit. However, the aspects of the present invention described herein are not limited in this respect, and can be used in systems wherein the content address for a content unit is not generated based upon the content of the content unit.

IV. Edge Caching

In accordance with one embodiment of the present invention, caching techniques are employed in a widely distributed architecture such as that describe above in connection with the My World information brokerage concept to provide a performance benefit to users by bringing content closer to the edge. This is shown conceptually in FIG. 1, which illustrates a computer system 100 that comprises a core 102 to store content on one or more OAS systems, a plurality of access points 104 that can comprise any user edge device capable of generating or accessing content as discussed above, and an edge caching layer 106 that is disposed logically between the access points 104 and the core. The edge caching layer 106 improves service time performance for users seeking to access content stored on the core 102 via the access points 104 as discussed below.

The system shown conceptually in FIG. 1 can be implemented in any of numerous ways, and the aspects of the present invention described herein are not limited to use with a system implemented in any particular way. One illustrative implementation of the system 100 is shown in FIG. 2.

Figure 2:
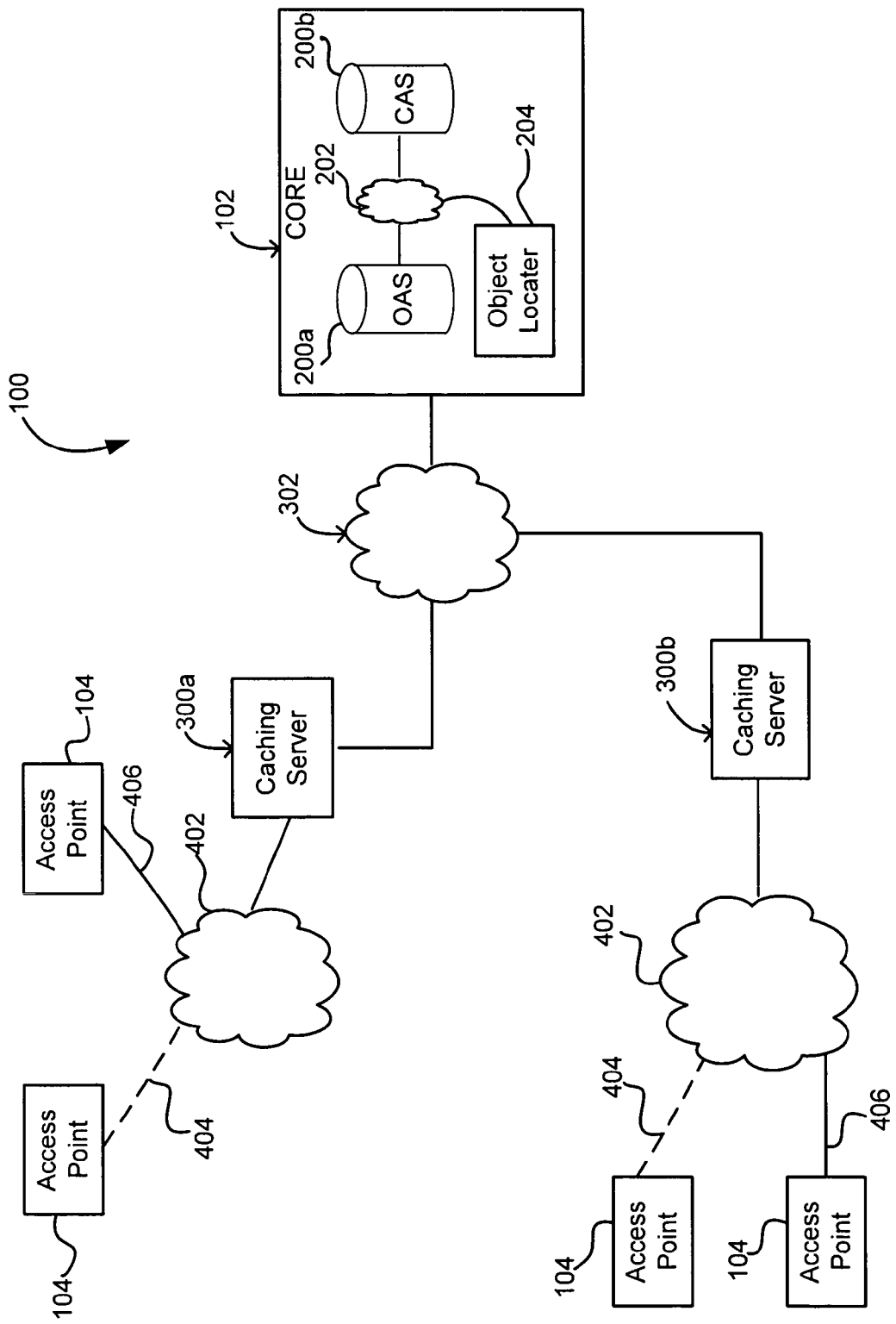
FIG. 2 is a schematic illustration of the manner in which the computer system of FIG. 1 can be implemented.

As illustrated in FIG. 2, the core 102 can be implemented using one or more OAS systems 200a, 200b. In accordance with one illustrative embodiment of the invention, one or more of the OAS systems may be a content addressable storage (CAS) system as shown at 200b. A CAS system is one in which the object identifier is generated based at least in part on the content of the content unit (e.g., by applying a hashing algorithm to the content unit). Examples of CAS systems are described in the applications listed in Table 1 below. In accordance with one embodiment of the present invention, CAS systems are employed wherein the object identifier for a content unit is generated based upon a hash of the entire content of the content unit. This is advantageous in that it can enable verification to ensure that errors have not resulted in a content unit during storage and/or transmission because the receiving device can apply the hashing algorithm to ensure that it results in the generation of the same content address previously generated for the content unit. However, it should be appreciated that the embodiments of the invention described herein are not limited in this respect, and can be used with an OAS system of any type, including those that generate a content address based on only a portion of a content unit or those that do not generate an object identifier by hashing any of the content of the content unit.

In accordance with one embodiment of the present invention, the core comprises multiple OAS systems (which may all be of the same type or of different types, e.g., some CAS systems and some not) that may be connected via a communication medium 202. The communication medium 202 is illustrated in FIG. 2 as a cloud to demonstrate that it can take any form, as the invention is not limited to use with a system that has a core that employs any particular type of communication medium to communicate between multiple OAS systems. It should be appreciated that the communication medium 202 can take the form of numerous different communication mediums (e.g., networks) that enable the OAS systems that form the core to collectively store and retrieve content units.

As discussed above, one exemplary application for the caching techniques of the present invention are for use in a system such as that described in connection with the My World information brokerage concept. It should be appreciated that such a system envisions the core 102 as a large scale distributed environment accessible from virtually any location in the world, much like the Internet. Thus, the core 102 may comprise a number of different OAS systems that may be concentrated or distributed geographically to perform the storage and retrieval functions described herein.

In addition, it should be appreciated that the caching techniques described herein are not limited to use with a large scale system of the type envisioned in the My World information brokerage concept, and can be used to improve performance in any computer system that employs one or more OAS systems that store and retrieve content for one or more users. Thus, the core 102 alternatively can be comprised of as small as a single OAS system that is designed to store and retrieve content (e.g., for use in a typical host computer/ storage system environment wherein the OAS system stores content for one or more applications running on the host computer). In this respect, the caching aspects of the present invention described herein can be employed in any computer system employing one or more OAS systems and one or more devices that seek to access content stored thereon, no matter on how large or small a scale.

As illustrated in FIG. 2, in addition to the OAS system(s), the core comprises an object locator 204. The function performed by the object locator 204 is to respond to requests to retrieve content units stored on the core 102 by locating the requested object(s) (the terms "object" and content unit" are used interchangeably herein) based upon object identifiers for the content units provided in specific requests, or based on specified search parameters (e.g., metadata). The object locator 204 can be implemented in any suitable way, as the aspects of the present invention described herein are not limited to a system wherein the core implements this functionality in any particular manner. Examples of techniques for locating content units stored on an OAS system are described in several of the applications listed in Table 1, but these are merely illustrative.

As an example, the core 102 may maintain a mapping of information that maps each object identifier to a particular storage location on one or more of the OAS systems where the associated content unit is stored. In response to a request to access a content unit, the object locator 204 may review this mapping information and forward the request to an OAS system that has the requested content unit. It should be appreciated that the core 102 may optionally implement fault tolerant techniques so that the content unit may be stored at multiple locations. The mapping information may be stored in a single location or it may be distributed across a number of devices accessible to the object locator 204 (e.g., across the OAS systems in the core 102).

Alternatively, rather than storing mapping information that can be used to locate a content unit based upon its object identifier, the core may employ query techniques so that when a request is received specifying a particular object identifier, the OAS systems that make up the core may be queried to determine which store(s) the requested content unit. Any other suitable technique can be employed, as the present invention is not limited to use with a system in which the core implements this functionality in any particular way.

The capability of the object locator 204 to locate objects based upon search parameters (e.g., metadata) can be implemented in any manner using any suitable searching techniques, as the aspects of the present invention described herein are not limited to use with a core that implements such a searching capability in any particular manner.

It should be appreciated that the OAS system(s) that implement the core 102 can store content units on any suitable storage medium, as the aspects of the present invention are not limited to use with a core that stores content on any particular type of storage media. In accordance with one embodiment of the present invention, the OAS system(s) store content on non-volatile storage media (e.g., disk drives and/or tape).

In addition, in accordance with one particular (but optional) embodiment of the present invention, the OAS system(s) in the core 102 can be implemented in a staged arrangement. Thus, content units initially stored to the core 102 may be stored to one or more OAS system(s) that employ a first type of storage medium (e.g., disk drives), but the core 102 may also employ a second storage of one or more OAS systems that employ a different type of storage medium (e.g., tape) that may be less expensive than the storage media used in the first stage. Thus, content units can be archived from the first stage to the second based on any desired criteria (e.g., content units that are not accessed for a specified period of time may be archived). This can be done in any suitable way, as the aspects of the present invention described herein are not limited in any respect to the manner in which the core 102 is implemented. Examples of such archiving systems are described in some of the applications described in Table 1, including Ser. No. 11/212,898 entitled "Methods and Apparatus for Managing the Storage of Content."

As illustrated in FIG. 2, the caching layer 106 can be implemented using one or more caching servers 300a, 300b. While two caching servers are illustrated in FIG. 2, it should be appreciated that the present invention is not limited to using any number of caching servers. Thus, a single caching server could be employed, or numerous caching servers could be employed, particularly for a widely distributed system of the type envisioned by the My World information brokerage concept. The caching server(s) can be connected to the core 102 via any suitable communication media, as illustrated conceptually via the cloud 302 in FIG. 2. The cloud 302 can include one or more wired or wireless networks, as the aspects of the present invention described herein are not limited to any particular technique for enabling communication between the caching server(s) 300a-b and the core 102.

The access points 104 can be connected to the caching server(s) 300a-b in any suitable way, as illustrated conceptually via the clouds 402. While four access points are illustrated in FIG. 2, it should be appreciated that the aspects of the present invention described herein are not limited to use with a system that employs any particular number of access points and (as discussed above) can be implemented in a system with a single device that serves as an access point or a widely distributed system with numerous (e.g., millions of) users worldwide. As further mentioned above, some of the access points may be wireless devices that communicate with the caching server(s) over at least one wireless network illustrated conceptually by the dotted lines shown at 404 in FIG. 2, and/or devices that communicate via a wired connection illustrated at 406 in FIG. 2. The aspects of the present invention described herein are not limited in any respect by the manner in which the access points 104 communicate with the caching layer 106 (FIG. 1).

In the implementation illustrated in FIG. 2, each of the access points 104 gains access to the core 102 via the caching layer 106 (e.g., the caching server(s) 300a-b). However, it should be appreciated that the aspects of the present invention described herein are not limited in this respect, and that it is not required that the caching services described herein be provided for all access points 104. For example, in a distributed system, it may be possible that caching servers are unavailable in certain geographical locations and/or it may be desired to not provide caching services for particular types of access points. In addition, while not shown in FIG. 2, it is also envisioned that parallel paths for one or more of the access points 104 can be provided to the core 102, including some that do not pass through the edge caching layer 106.

It should be appreciated that the caching servers 303a-b need not be dedicated exclusively to providing the caching functionality described herein, as the caching functionality can be performed on any computing device, including not only servers dedicated exclusively to performing caching functions, but also computers that perform other functions (e.g., on computers that perform networking functions such as switching or routing in a communication path between the access points 104 and the core 102, on edge devices, and/or on computers that also form part of the core).

As mentioned above, a benefit performed by the edge caching layer 106 is improved service time performance for users seeking access to content stored on the core 102. This can be achieved in any of numerous ways, and the aspects of the present invention described herein are not limited in this respect.

For example, in accordance with one embodiment of the present invention, the components in the edge caching layer 106 (e.g., the caching servers 300a-b in FIG. 2) are configured to respond more quickly to an access request for a content unit than the core 102 is able to respond. This improved performance can be provided in any number of ways, and the present invention is not limited in this respect. For example, the caching servers can be provided with high performance hardware that is designed to provide rapid access response and/or fewer content units may be stored in the edge caching layer 106 so that it may take less time for the edge caching layer 106 to locate a requested content unit than it would for the core 102. In addition, when employed in a widely distributed system such as that envisioned in the My World brokerage information concept, components of the edge caching layer may also be positioned geographically closer to particular access points than those access points are located relative to the core so that there is less latency in communications passing between the access points and the edge caching layer 106. As mentioned above, these are merely examples of the ways in which the edge caching layer 106 can provide improved service time performance, and the aspects of the present invention described herein are not limited to providing improved service time performance in any of these particular ways.

In accordance with one embodiment of the present invention designed for use with a widely distributed system, it is contemplated that caching servers 300(a-b) can be distributed geographically so that requests from any access point 104 disposed geographically remotely from the core 102 can be responded to by a caching server 300a-b that is disposed physically closer to the location of the access point than the core is. This results in improved performance through diminished latency for access requests and content returned in response to such requests passing through the communication mediums (e.g., 402 and 302 in FIG. 2) between the access point 104 and the core 102. Thus, a function served by the caching layer 106 in one embodiment is to bring content closer to the edge (e.g., closer to the access points that will request access to it).

The edge caching layer 106 may perform an object locating function in much the same manner as was described in connection with the object locator 204 of the core 102. As with the object locator 204 in the core, the object locating function can be performed in the caching layer 106 in any suitable manner, as the present invention is not limited to any particular implementation technique.

When responding to an access request from any particular access point, the edge caching layer 106 may respond as a single unitary entity, or the caching layer may be logically subdivided into regions. In this respect, in one embodiment of the present invention, when an access request is received directed to any particular content unit, the caching layer 106 determines whether there is a hit for the requested content unit by determining whether it is stored anywhere in the entire edge caching layer 106. If the requested content unit is stored in the caching layer so that there is a hit, the request is serviced by the caching layer 106, which returns the content unit to the requesting device. Alternatively, if there is a miss (i.e., the requested content unit is not stored in the edge caching layer 106), the request will be passed along to the core 102, which will then return the requested content unit to the requesting access point, either directly or via the edge caching layer 106.

In an alternate embodiment of the invention, the edge caching layer 106 is logically subdivided into regions, and a hit or miss in the edge caching layer 106 is determined based upon whether the requested content is within the region that serviced the access request. This provides advantages in terms of response time for the edge caching layer 106 in that it is not necessary to determine whether the content unit is stored anywhere in the entire edge caching layer 106, so that the determination can be made more quickly by examining a smaller region of the edge caching layer. For example, if the edge caching layer employs an object locator scheme that stores a map of information mapping object identifiers to locations in the edge caching layer 106 wherein the corresponding content units are stored, dividing the edge caching layer 106 into regions may result in a smaller map that may be searchable more quickly. Similarly, if the edge caching layer 106 employs an object locating technique that issues queries to the caching servers to determine if they have a requested content unit, limiting the number of caching servers to be queried can improve the access time of the edge caching layer.

In this respect, it is contemplated that although the widely distributed network My World information brokerage concept discussed above should make content available to a user anywhere in the world, most users typically will seek access to their content from confined geographical regions (e.g., in the areas where they live and work). Thus, in accordance with one embodiment of the present invention, the caching layer is subdivided into regions to provide improved performance by negating the requirement that for every access request a determination be made as to whether a requested content unit is stored in any of numerous caching components spread all over the world.

It should be appreciated that in the embodiments of the present invention that divide the edge caching layer 106 into regions, the subdivision can be performed in any suitable manner, as this aspect of the present invention is not limited to any particular implementation technique. As one example, the edge caching layer 106 may be subdivided based upon geographical location, but other subdivision techniques can be employed in addition to or instead of applying geographic constraints.

As will be described in more detail below, in accordance with one embodiment of the present invention, prefetching techniques are employed to improve service time performance. Thus, even if an initial access request misses in the edge caching layer in part due to the subdivision into smaller regions, intelligent prefetching can increase the likelihood that later access requests will hit in the region through which the user is seeking access.

While subdividing the edge caching layer 106 into regions may provide the advantages discussed above, it should be appreciated that the aspects of the present invention described herein are not limited in this respect, and that the edge caching layer 106 need not be subdivided.

Figure 3:
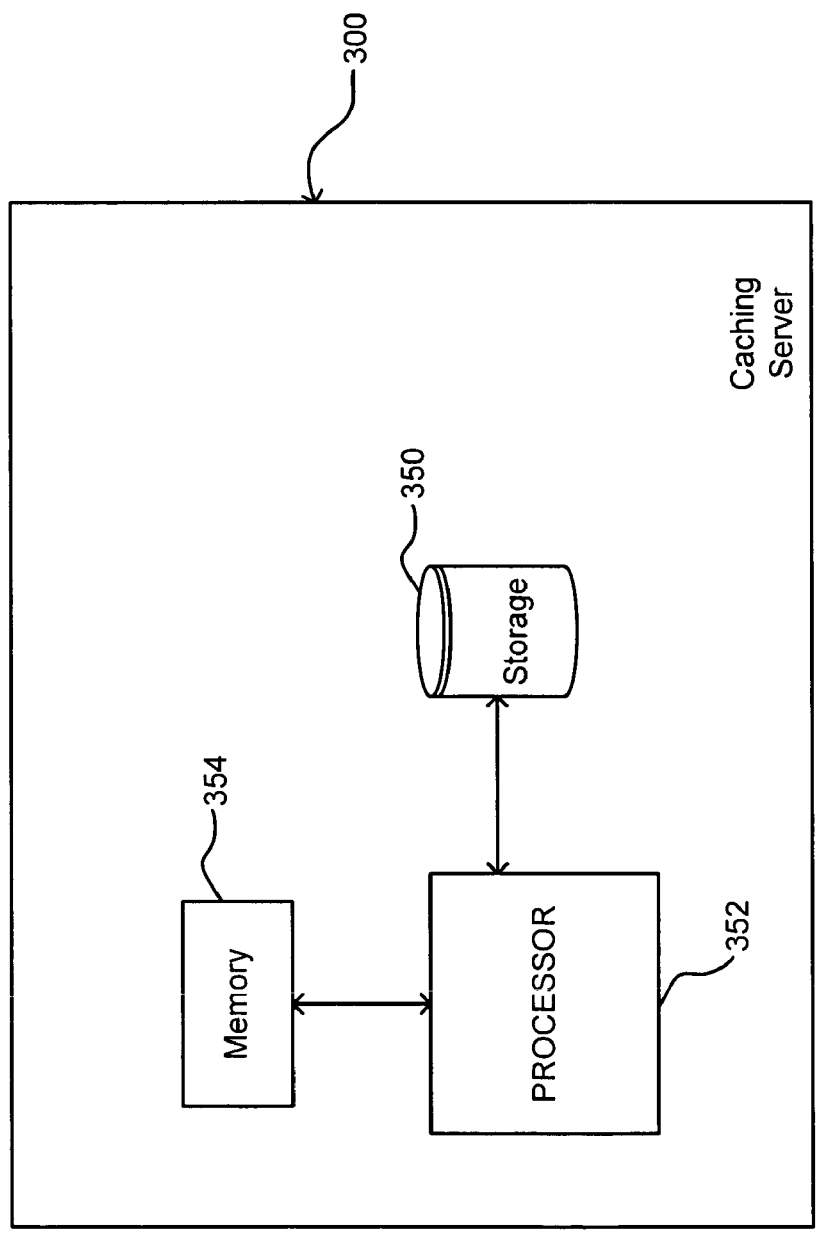
FIG. 3 is a block diagram of a caching server such as that shown in the system of FIG. 2.

As mentioned above, the caching servers 300*a*-*b* can be implemented in any suitable manner, as the aspects of the present invention described herein are not limited in this respect. An exemplary configuration for a caching server 300 is shown in FIG. 3. The caching server comprises one or more storage media 350 that is used to temporarily store content units that reside in the caching layer. In accordance with one embodiment of the present invention, the storage medium 350 is a hard disk drive, although it should be appreciated that other types of storage media can be used.

The caching server 300 further comprises a processor 352 and a memory 354 coupled thereto, so that the processor 352 can be programmed by computer code stored in the memory 354 to perform the functions described herein. The computer code can take any desired form (e.g., software, firmware) as the present invention is not limited to any particular implementation technique. In addition, while a single memory 354, single processor 352 and single storage medium 350 are shown in FIG. 3, it should be appreciated that this is just illustrative, and that any number of any of these components can be employed. In this respect, as will be described further below, the caching server 300 performs a number of functions. These functions can be controlled by a single programmed processor, or by multiple processors (e.g., each programmed to perform a subset of the functions described herein).

In accordance with one embodiment of the present invention, the caching layer 106 is implemented as a write-through caching layer, so that content units written to the caching layer are written through to the core 102. This can be performed in any suitable manner, as the aspects of the present invention described herein are not limited in this respect. In addition, it should be appreciated that the aspects of the present invention described herein are not limited to use with a write through cache.

In accordance with one embodiment of the present invention, when content that is generated or provided from an access point 104 is written to the computer system, the content is stored in the caching layer 106 (e.g., in one or more of the caching servers 300*a*-*b* in FIG. 2). As discussed above, the content can be associated with metadata and an object identifier associated with the content and its metadata can be generated. The object identifier can be generated by the access point, by the caching layer 106, by the core 102, or by any other component in the computer system, as the aspects of the present invention described herein are not limited in this respect.

In accordance with one embodiment of the present invention, requests for content from one access point may be serviced by another access point that is in possession of the requested content. This can be performed in any suitable manner, as the present invention is not limited to any particular technique. For example, any suitable peer-to-peer communication techniques can be employed, examples of which are described in the first three applications listed in Table 1 below. In addition, the caching layer 106 can facilitate direct communication between access points in any suitable manner.

1. Configuring the Edge Caches

Conventional caches for other types of storage systems (e.g., block I/O storage systems) typically are configured based upon fixed size units (e.g., slots or pages), a maximum storage capacity for the cache and a maximum number of slots. Applicants have appreciated that caching variable length content units that are accessible via object addresses presents fundamentally different challenges and opportunities than have conventionally been encountered in implementing caches in other types of storage systems (e.g., block I/O storage systems).

In accordance with one embodiment of the present invention, each edge cache is configured to have a limit placed on the number of separately accessible content units (i.e., accessible via distinct object identifiers) that can be stored in the cache simultaneously at any particular time. Configuring each cache in this manner is advantageous in that the number of separately accessible objects or content units can have an impact on the cache's ability to organize itself to manage the storage and retrieval of those objects, and can impact its performance when responding to requests for content units.

In accordance with another embodiment of the invention, each edge cache may be configured to place a limit on the total volume of content that it can store simultaneously at any particular time, as each cache may have a finite amount of storage medium accessible to it that should not be exceeded.

Figure 4:
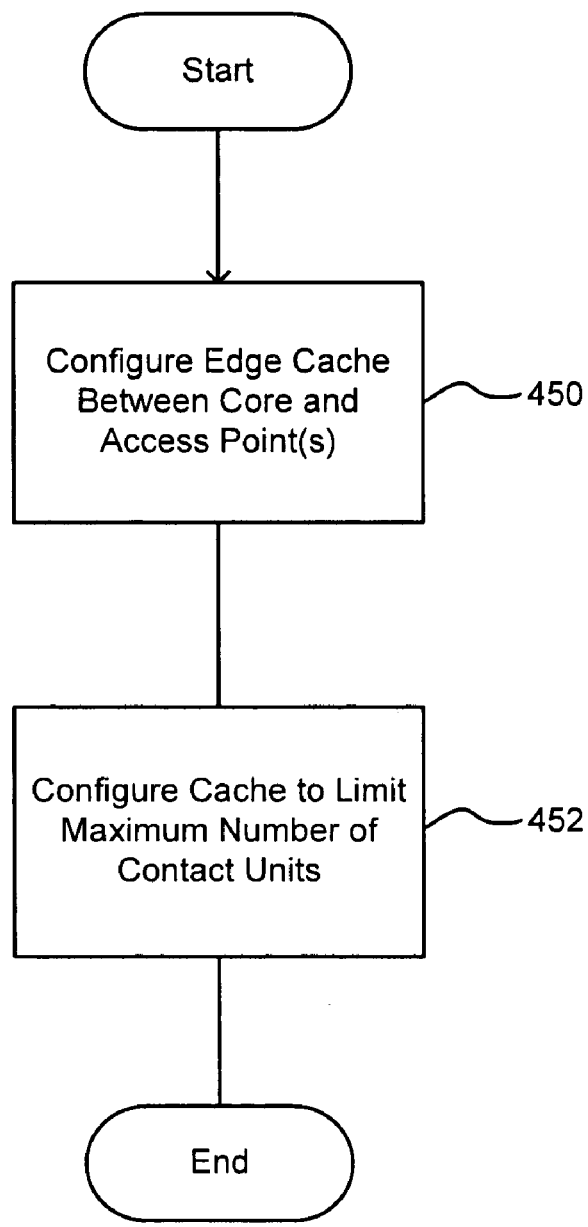
FIG. 4 is a flow chart of a process of configuring an edge cache to limit the maximum number of content units in accordance with one embodiment of the present invention.

A process for configuring an edge cache in accordance with one embodiment of the present invention is illustrated in FIG. 4. At act 450, an edge cache is configured to be disposed logically between the core and one or more access points so that access requests from the one or more access points to the core pass through the edge cache before being passed to the core. It should be appreciated that the edge cache need not be disposed physically at a location that is between the access point(s) and the core (e.g., the physical distance between the access point and the core could actually be shorter than the distance between the access point and the edge cache). Thus, although one embodiment of the present invention is directed to physically disposing an edge cache so that the distance from the access point to the edge cache is shorter than the distance between the access point and the core (with the distance being measured in the length of the communication medium that communications travel over between these components), it should be appreciated that all embodiments of the present invention are not limited in this respect, and that the edge cache can perform the functions described herein without being physically disposed between the access point(s) and the core.

As shown in FIG. 4, the edge cache is further configured in act 452 to limit the maximum number of content units that can be stored thereon simultaneously for the reasons discussed above.

It should be appreciated that the act 452 of configuring the cache to limit the number of content units need not be performed after the cache is configured to be disposed logically between one or more access points and the core, as these configuration acts can be performed in any order or simultaneously.

It should be appreciated that other configuration acts in addition to those illustrated in the process of FIG. 4 (e.g., configuring to place a limit on the total volume of content the cache can store simultaneously) can be performed instead of or in addition to the acts illustrated in the process of FIG. 4, as all embodiments of the invention are not limited to performing configuration in the manner illustrated by the process of FIG. 4.

The configuration actions described in FIG. 4, as well as any others described herein, can be performed in any suitable way, as the aspects of the present invention described herein are not limited in this respect. For example, the configuration can be performed under the control of a system administrator or in any other suitable way.

2. Replacement Policy

As discussed above, the edge caching layer 106 (FIG. 1) stores content units temporarily, whereas the core 102 stores them indefinitely. In this respect, while the core 102 may implement relocation policies for any of numerous reasons (e.g., to more efficiently allocate content units among multiple OAS systems that may make up the core, to bring on new OAS systems and/or phase out old ones) so that a content unit may be moved around within the core, the core 102 stores the content unit indefinitely unless or until it is deleted by a user. Conversely, the edge cache(s) stores content units temporarily for performance reasons, with the expectation that they ultimately will be removed from the cache and be retained only in the core 102.

Each edge cache may be of finite capacity. Thus, when it is desired to add content units to an edge cache that is already full (i.e., at its maximum limit of capacity or number of content units), some of the content units stored in the edge cache may be replaced to make room for new content units. Replacing a content unit in an edge cache involves removing it from the edge cache. In addition, in embodiments of the present invention wherein the cache is not implemented as a write through cache, it may be possible that content units in an edge cache may not yet reside in the core 102. In accordance with those embodiments, replacing a content unit in an edge cache further involves writing the content unit to the core 102 to ensure that it will be retained.

Several aspects of the present invention described herein are directed to other aspects of the caching of content and are not limited in any respect by the nature of the replacement policy employed for the edge caches, so that any replacement policy can be employed. Examples of replacement policies that can be used include replacing the oldest content unit in the cache (i.e., the content unit that has resided in the cache for the longest period of time) and/or the least recently used content unit (i.e., the content unit that was least recently accessed), although other techniques are possible.

In accordance with some embodiments of the present invention, particular advantageous criteria may be evaluated to determine which content units should be replaced. Any of these replacement criterion can be used separately to establish a replacement policy. Alternatively, all of these criteria can be considered together to implement a replacement policy, or any combination of two or more can be considered together.

In accordance with one embodiment of the present invention, content units stored in the cache are evaluated based upon the metadata associated with the content units to determine content units that should be replaced. This can be accomplished in any of numerous ways, as the aspect of the present invention that relates to examining the metadata of evaluated content units as part of the replacement policy is not limited in this respect.

In accordance with one embodiment of the present invention, when the replacement is performed in response to a prefetch operation performed in response to an access request that misses in the edge cache, the metadata of the content unit being requested is considered and used when evaluating the metadata of the content units in the cache for replacement. This can be accomplished in any of numerous ways. As one example, consider a replacement triggered by an access request that sought access to a content unit that was a photograph taken on the $4^{th}$ of July in 2005. The replacement policy may make educated assumptions about content units that the user will next seek access to. In this respect, it may be assumed that a user seeking access to a photo will not simply not look at one photograph, but may seek access to numerous photos. Thus, preference may be given to leaving in the edge cache(s) any content units that comprise photos, and removing other types of content. Going one step further, an assumption can be made that a user seeking access to photographs on that date may soon seek access to other photographs taken on that date, pictures taken around that time frame and/or photographs taken on the $4^{th}$ of July in other years. Thus, even amongst the class of content units relating to photographs, preferences may be given as to which should be replaced and which retained using educated assumptions based upon the metadata associated with the content unit requested in the access request and the metadata of content units stored in the edge caching layer.

In the example discussed above, the access request that triggered the evaluation of content units for replacement is one that sought access to a single content unit and that missed in the cache. However, it should be appreciated that the aspects of the present invention relating to the use of a replacement policy are not limited in this respect, and that replacement can be triggered in other ways, including in response to access requests that hit in the edge caching layer and those that may seek access to multiple content units (e.g., a query seeking access to content units meeting specified criteria). In addition, in the embodiments described above, the replacement policy is triggered based upon a single recent access request (e.g., a query, a hit, a miss, etc.), but it should be appreciated that the replacement policy alternatively may evaluate multiple recent access requests in any suitable manner.

It should be appreciated that the nature of assumptions that may be made based upon metadata of recently accessed content units and/or metadata of content units in the cache are virtually limitless, and can vary significantly depending upon the type of content and the type of metadata available. Thus, the examples are provided above merely to illustrate the nature of the aspect of the present invention described herein wherein metadata associated with content units can be used in evaluating content units for replacement, and are not intended to be limiting.

In the example described above, the metadata for evaluating content units was compared to the metadata for an access request. However, it should be appreciated that the aspect of the present invention that relates to analyzing metadata for evaluating content units for replacement is not limited in this respect, and that the metadata for evaluating content units can be used in numerous other ways. For example, the metadata of evaluated content units in the edge caching layer could simply be evaluated on its own merits, it could be compared against historical data retained for usage patterns for the user, could be compared against the identity of the device through which a recent (e.g., latest) access request was issued, etc. For example, if the request was issued from an MP3 player, preference may be given to retaining music files and replacing other types of content. Going one step further, if a recent request is for a particular song, preference may be given to retaining other types of music files that relate to the same artist, album, genre, etc.

In accordance with another embodiment of the present invention, replacement decisions on evaluated content units in the edge cache can be made based upon the content in the evaluated content units. In this respect, it should be appreciated that with some types of content units it may be possible to determine the content type by examining the content itself, rather than (or in addition to) analyzing metadata associated with the content unit. This can be useful in any of the ways discussed above relating to decisions based upon the type of content. As should be clear from the foregoing, decisions based upon the content type of evaluated content units in the edge cache can be based solely upon the type of the evaluated content unit, a comparison with a recently accessed content unit (e.g., that hit or miss in the cache), or in any other desired way, as the aspect of the present invention that uses content type as a criterion for the replacement policy is not limited in any respect to the way in which this information can be used to determine which content unit(s) to replace.

In accordance with another embodiment of the present invention, the replacement policy can evaluate an identity of the source that wrote the evaluated content(s) to the computer system for storage on the core. The identity of the source can comprise the identity of an individual (e.g., a user), the identity of the type of device from which the content unit was sourced, and/or the identity of a specific device from which the content was sourced. This can be used in any desired way, as the aspect of the present invention that evaluates the source of an evaluated content unit is not limited in any respect by the way the information can be used. For example, when a recent access to the cache was performed by a particular user, preference may be given for retaining other content units owned by that user in the cache and replacing others. When a recent access was via a particular type of device (e.g., an MP3 player) preference may be given for retaining content units of the type most typically accessed by such a device and replacing others. Similarly, when a recent access request was from a particular specific device, preference may be given for retaining content units that were sourced to the computer system (e.g., for storage on the core) from that particular device which can be identified in any suitable manner (e.g., by assigning unique identifiers to access devices). Again, the ways in which the source information can be used are virtually limitless, and the aspect of the present invention that relates to evaluating source information as a replacement criterion is not limited to any particular uses.

In accordance with another embodiment of the present invention, the source (e.g., user and/or device) of one or more recent access requests (as opposed to, or in addition to, the source of content units in the cache evaluated for replacement) can be considered as part of the replacement policy. Examples of such uses of that information were described immediately above (e.g., for comparison to the sources of evaluated content units), but it should be appreciated that the aspect of the present invention that relates to considering the source of one or more recent access requests as a replacement criterion is not limited to the examples given above.

In another embodiment of the present invention, the size of the evaluated content unit(s) can be considered as a criterion for the replacement policy. As with the other replacement criteria, this information can be employed in any desired way. For example, when it is determined that recent accesses to the edge cache have requested content units of a particular size, it may be assumed that the user will be continuing to seek access to content units of that size, and a preference can be given to retaining similarly sized content units in the cache while replacing others. Alternatively, when a replacement is being performed and the cache is full, preference may be given to replacing large content units, to make more room available in the cache and enable a greater number of new content units to be brought in (e.g., using a prefetch policy such as that discussed below).

Figure 5:
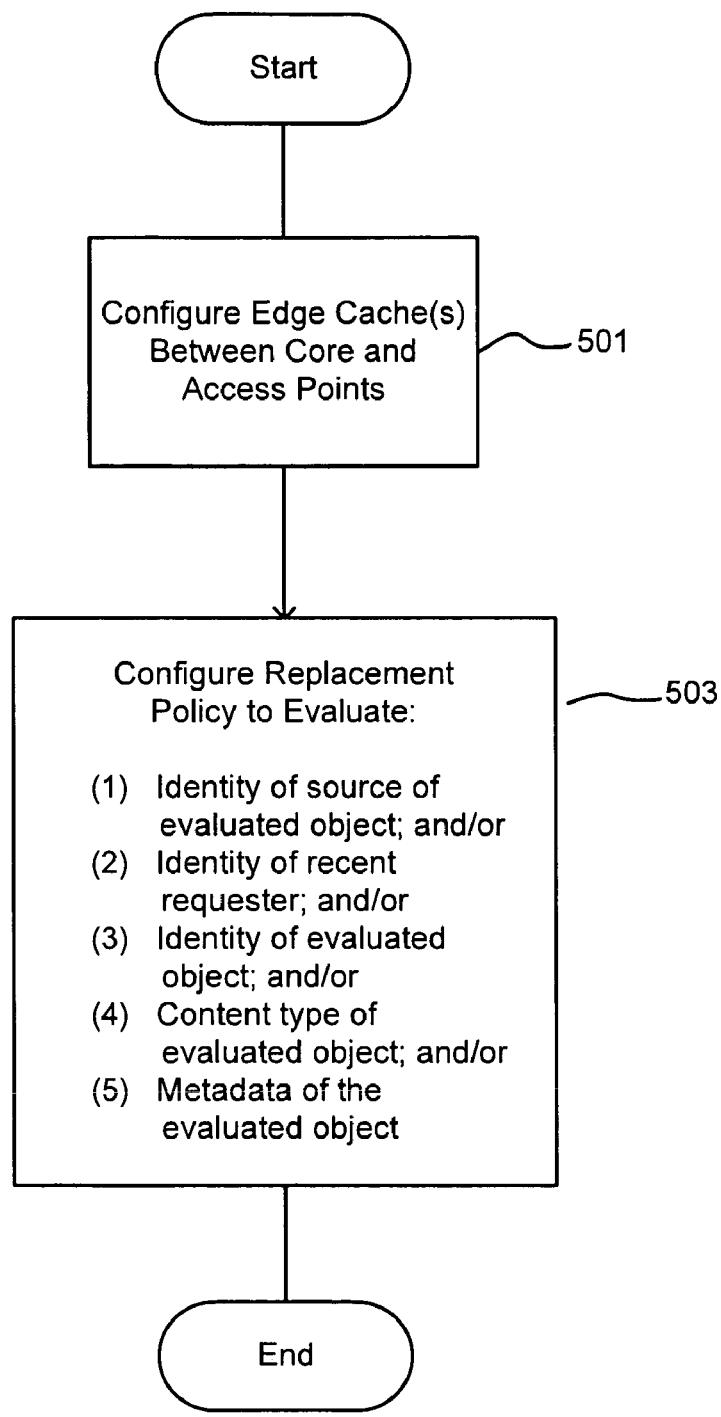
FIG. 5 is a flow chart of a process of configuring an edge cache to have a replacement policy in accordance with one embodiment of the present invention.

As should be appreciated from the foregoing, one embodiment of the present invention is directed to a process for configuring an edge cache as disclosed in FIG. 5. At act 501, the edge cache is configured to be disposed logically between the core and one or more access points, in much the same manner as described above in connection with act 450 of FIG. 4. Thereafter, in act 503 a replacement policy is configured for the cache to evaluate one or more of the following replacement criteria: (1) the identity of a source of an object (i.e., a content unit) evaluated for replacement; (2) the identity of the source of one or more access requests to the cache; (3) the size of the evaluated object(s); (4) the content type of the evaluated object(s); (5) metadata associated with the evaluated object (s). As with the process of FIG. 4, the configuration process of FIG. 5 can be executed by a system administrator or any other suitable individual, and may alternatively be an automated process, as the present invention is not limited in this respect.

3. Prefetching

In accordance with another embodiment of the present invention, prefetching techniques are employed to improve performance of the computer system in responding to access requests for content by predicting content that the user(s) may seek to access in the near future and moving that predicted content to one or more edge caches before the access requests for that content are received. For example, referring to the My World information brokerage concept described above, predictions may be made about content that a user may seek to access via one of the access points 104 (FIG. 1), and based on those predictions one or more content units can be prefetched from the core 102 to the edge caching layer 106 so that it is disposed closer to the particular access point 104 through which access is expected and thereby available for quicker access.

As with the other embodiments described herein, the aspects of the present invention relating to prefetching content units are not limited to use in a large and widely distributed system such as that envisioned by the My World information brokerage concept, and can be used in any computer system employing an OAS system. In addition, while various computer system configurations described herein relate to a system such as that shown in FIG. 2 where a single stage of caching servers 300 is disposed between the access points 104 and the core 102, it should be appreciated that multiple caching stages can be employed. In accordance with one embodiment of the present invention, when multiple caching stages are employed, they can be arranged in a hierarchical fashion, with the stages in the caching layer getting progressively smaller (and optionally faster) as they move further from the core and closer to the access point(s). When employed in a computer system employing a multi-staged caching structure, it should be appreciated that the prefetching techniques described herein can be employed to prefetch content units from the core to a first stage of the caching layer, and/or from any stage of the caching layer logically disposed closer to the core to another stage disposed closer to the access point(s).

Prefetching has been used in other types of computer systems (e.g., with block I/O storage systems), but Applicants have appreciated that possibilities exist for performing prefetching based upon different prefetching policies in a computer system employing an OAS system. Thus, in accordance with one embodiment of the present invention, the computer system can be configured to implement prefetching based upon one or more unique criteria as discussed below.

As will be further discussed below, the prefetching policy can be established in any suitable manner (e.g., via a system administrator) and can be controlled by any component in the computer system, including the caching layer 106 which can pull content units from the core 102 (or in a multi-staged system from a higher level stage to a lower level one) based upon the prefetching policy, via the core 102 (or higher level caching stage) which can push content units to the caching layer 106 (or lower level caching stage) in accordance with the prefetching policy, and/or any other component in the computer system that can control the movement of content units from the core to the caching layer and/or from a higher level caching stage to a lower level caching stage in a multi-staged environment.

It should be appreciated that the prefetching policy can employ many of the same concepts that were described above in connection with the replacement policy. In this respect, as was discussed above, the replacement policy can be configured to seek to maximize the possibility that content units that are likely to be accessed by the user in the near future are retained in the cache rather than replaced. Similar principles can be applied to the prefetch policy to evaluate candidate content units that are likely to be accessed in the near future, and if they are not yet present in the cache, to prefetch them (e.g., from the core 102 to the caching layer 106 or from a higher level caching stage to a lower level one). Thus, in accordance with one embodiment of the present invention, the computer system can be configured to employ a prefetch policy that evaluates content units as candidates for being prefetched (e.g., content units in the core 102 or in a higher level caching stage) based upon a prefetch policy.

In accordance with one embodiment of the present invention, the prefetch policy evaluates content units based upon an identity of a source that wrote the evaluated content units to the computer system. The source may be a type of device, a particular device and/or a particular user. For example, as discussed above in connection with the replacement policy, when an access request is made for a content unit by a particular user and/or from a particular device, a prediction may be made that the same user may seek access to additional content units, the same device may be used to access content units sourced from that particular device, and/or the device of a particular type may seek to access particular types of content. For example, if a particular user accesses a content unit from an MP3 player, it may be predicted that in the near future the same user will seek to access additional content units that comprise music stored to the computer system for that user. Thus, that source can be used to evaluate content units as candidates for prefetching, with a preference given to content units that were written to the computer system by that particular user, are of a type typically accessed by that type of device, and/or were sourced by that particular device.

As another example, historical access patterns may be stored and evaluated for particular users and can be used along with the information identifying a source to determine candidates for prefetching. For example, historical patterns may demonstrate that a particular user that seeks access to the system from a particular type of device (e.g., a cell phone) frequently does so to access particular types of content units.

In accordance with another embodiment of the present invention, the prefetch policy can evaluate the size of an evaluated content unit to determine candidates for prefetching. The size can be evaluated in any of numerous ways, examples of which were discussed above in connection with the replacement policy. For example, if recent access requests have sought access to content units of a particular size, it may be predicted that the user will continue seeking access to content units that are similarly sized and a preference may be given to those content units for prefetching. As another example, preference may be given to smaller content units as candidates for prefetching at the expense of larger content units, with the realization that prefetching may be inexact and that given that caching resources are finite, preference can be given to prefetching a greater number of smaller content units rather than fewer larger ones. These are simply examples of the ways in which the size of evaluated content unit(s) can be considered, as the aspect of the present invention that considers size as a prefetch criterion is not limited in this respect.

In accordance with another embodiment of the present invention, the content type of the evaluated content unit(s) can be considered as a prefetch criterion. For example, if recent accesses from a user sought access to content of a particular type (e.g., music files, PowerPoint slides, etc.) it may be predicted that future access requests will seek access to content units of the same type, and a preference may be given to prefetching those types of content units. The content type for an evaluated content unit can be determined in any suitable way, including (at least for some types of content) by looking directly at the content itself and/or by evaluating metadata associated with the content.

Thus, in accordance with another embodiment of the present invention, metadata associated with an evaluated content unit can be evaluated as a prefetch criterion. Examples of the ways in which metadata for content units can be evaluated as a prefetch criterion include any of the examples discussed above in connection with the replacement policy. For example, when a recent access request sought a photograph from a particular time period, it may be assumed that the user may soon seek access to other photographs from the same time period or bearing some other relationship to the recently accessed photograph. As another example, when a recent access request was for a content unit that was a particular song, it may be assumed that the user may soon seek access to the entire album, other music from that artist or of that genre, etc., so that a preference may be made for prefetching such content units. As should be clear from the foregoing, examples of evaluating metadata can include giving a preference for evaluated content units that share one or more characteristics in common with the metadata of recently accessed content units, based on the assumption that future access requests may seek to access content units that similarly share those characteristics in their associated metadata, so that a preference can be given to prefetching such content units. It should be appreciated that the examples described above are merely illustrative. The metadata can be evaluated in any desired way, as the aspects of the present invention described herein that relate to the evaluation of metadata by a prefetch policy are not limited to any particular evaluation techniques.

In accordance with a further embodiment of the present invention, an identity of a requestor that issued one or more recent requests to access one or more content units can be considered in the prefetch policy. The requester can be an individual, a type of device and/or a particular device. For example, when it is determined that a particular user is seeking access to a content unit, content units having metadata that associate them with that user can be given a preference for prefetching. When a request is issued from a particular type of device (e.g., an MP3 player), preference can be given for prefetching content units (e.g., music files) that are frequently accessed by that type of device. Similarly, when a request is issued from a particular device, preference can be given for prefetching content units associated with that device (e.g., content units that were sourced to the computer system from that device).

In accordance with another embodiment of the present invention, the time at which an evaluated content unit was stored to the computer system (e.g., to the core 102 or a caching device) can be evaluated as part of the prefetch policy. This time information can be used in any suitable way, as the aspect of the present invention that evaluates the time that the evaluated content unit was written as a prefetch criterion is not limited in any respect. As one example, it may be assumed that a user seeking access to content units may desire to access a number of content units that were stored to the computer system proximate in time (e.g., a number of photographs that were taken and stored around the same time, a number of PowerPoint slides that were stored around the same time, etc.). Thus, preference may be given in the prefetch policy to prefetching content units that were stored to the computer system around the same time as content units recently accessed.

It should be appreciated that a particular prefetching operation can be initiated in any of numerous ways, as the present invention is not limited in this respect. For example, in accordance with one embodiment of the present invention, a prefetch operation may be initiated when access to a particular content unit is requested, when a request misses in the cache, and/or when a request hits in the cache. Alternatively, prefetching can be initiated on a continuous basis, rather than in a response to any particular access request.

In accordance with one embodiment of the present invention, the prefetching policy can be applied to all of the content units stored in the computer system (e.g., in the core 102 or in a higher level caching stage) as candidates to be prefetched. Alternatively, in accordance with an alternate embodiment of the present invention, it is appreciated that in some computer systems (e.g., a large distributed system such as that envisioned by the My World brokerage information concept) there may be sufficiently large numbers of content units so as to make it impractical or inefficient to evaluate all the stored content units as candidates for prefetching. Thus, in accordance with one embodiment of the present invention, content units stored on the computer system can be pooled into two or more groups and the prefetching policy can be used to evaluate content units only in one or more pools as candidates for prefetching, rather than evaluating all of the content units stored on the portion of the computer system from which prefetching is performed (e.g., the core or a higher level caching stage). This pooling can be accomplished in any suitable way, as the aspect of the present invention that limits the evaluation of content units for a prefetch policy to one or more pools is not limited to any particular implementation techniques. One or more of the applications listed in Table 1 below (e.g., application Ser. No. 10/911,330, entitled "Methods And Apparatus For Accessing Content In A Virtual Pool On A Content Addressable Storage System") describe a virtual pools concept that illustrates one technique for pooling OAS systems which can be employed, but the aspect of the present invention that relates to pooling content units as candidates for prefetching is not limited to pooling using any particular technique.

In a large scale widely distributed system such as that envisioned in connection with the My World brokerage information concept, content units can be pooled based upon geographical considerations, including a location from which they were sourced into the computer system and/or a location where they are physically stored on an OAS system in the core. In this respect, a user typically may source content to the core from a limited geographical area (e.g., home and office) and typically may seek access to that content from the same geographical area. Thus, although the My World concept envisions that the user should be able to access his/her content from any place in the world, it may be assumed that the user most typically will seek to access content from the same limited geographic area from which the user sourced the content. Thus, in one embodiment, the prefetching policy may be limited to evaluating content units on one or more OAS systems that store content sourced from that geographic area.

In another embodiment, grouping can be performed based upon the identity of a user. Thus, pools can be formed for each user, with prefetching being performed only on the content sourced from that user.

It should be appreciated that the above discussed examples of the criteria on which content units can be grouped are provided merely as examples, and that pools of content units can be grouped to form candidates for prefetching in any desired way, including pooling based solely upon any of the criterion discussed above, based on a combination of two or more of the criteria discussed above, and/or any other desired criteria.

Figure 6:
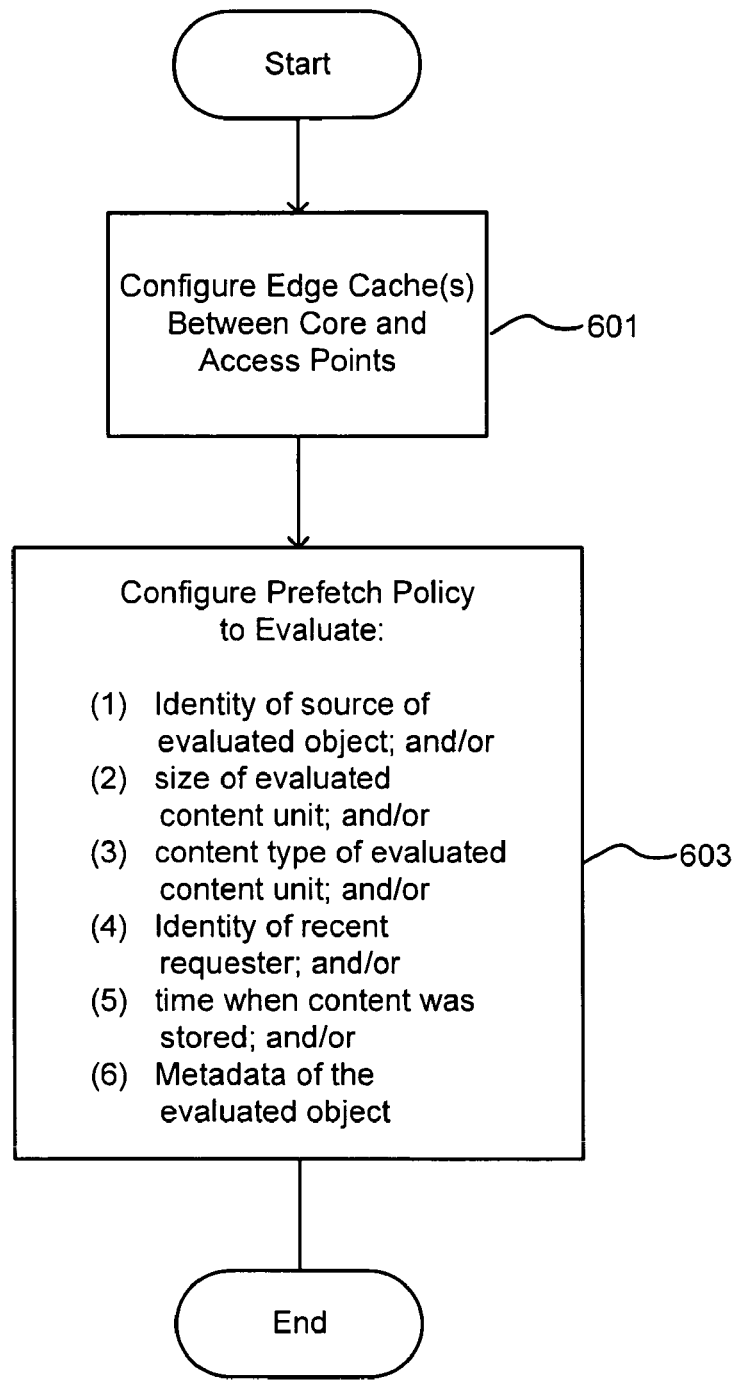
FIG. 6 is a flow chart of a process of configuring an edge cache to have a prefetch policy in accordance with one embodiment of the present invention.

As should be appreciated from the foregoing, one embodiment of the invention is directed to a process as illustrated in FIG. 6 that comprises an act of configuring one or more edge caches between the core and one or more access points as shown at act 601, and configuring a prefetch policy as shown at act 603. The prefetch policy evaluates one or more of the following criteria: (1) the identity of the source of an evaluated object (i.e., a content unit evaluated as a candidate for prefetching); (2) the size of the evaluated object; (3) the content type of the evaluated content unit; (4) the identity of a requester that issued a recent access request for one or more content units; (5) the time when the evaluated content unit was stored to the computer system; (6) metadata of the evaluated content unit. In accordance with some embodiments of the present invention, any one of these criteria can be employed alone. In alternate embodiments of the present invention, all of these criteria can be evaluated together, or any combination of two or more can be evaluated together to implement a prefetch policy.

It should be appreciated that the specific ways in which these criteria can be evaluated are virtually limitless, such that the embodiments of the present invention that relate to the use of a prefetch policy employing these criteria are not limited in any way to the manner in which they can be used to make prefetching determinations.

4. Grouping Content on One or More OAS Systems According to at Least One Prefetch Criterion In accordance with one embodiment of the present invention, one or more OAS systems are configured to organize at least some of the content units stored thereon in groups that are arranged according to at least one prefetch criterion. Organizing an OAS system in this manner may enable the OAS system to quickly and/or efficiently respond to prefetch requests.

As an example, consider a system in which the identity of an individual requestor is considered as at least one prefetch criterion. For example, the prefetch policy may assume that if recent access requests from a particular user X have been received at the OAS system, user X may issue additional access requests in the near future. Thus, if all content units associated with user X are grouped together (e.g., organized in a file or directory), the OAS system may be able to quickly and efficiently identify content units responsive to the prefetch policy.

It should be appreciated that the aspect of the present invention that relates to configuring the OAS system to organize content units according to at least one prefetch criterion is not limited in any respect by the nature of the particular prefetch criterion, and can be used with any single prefetch criterion or combination of prefetch criteria, including any of those discussed above or others.

Figure 7:
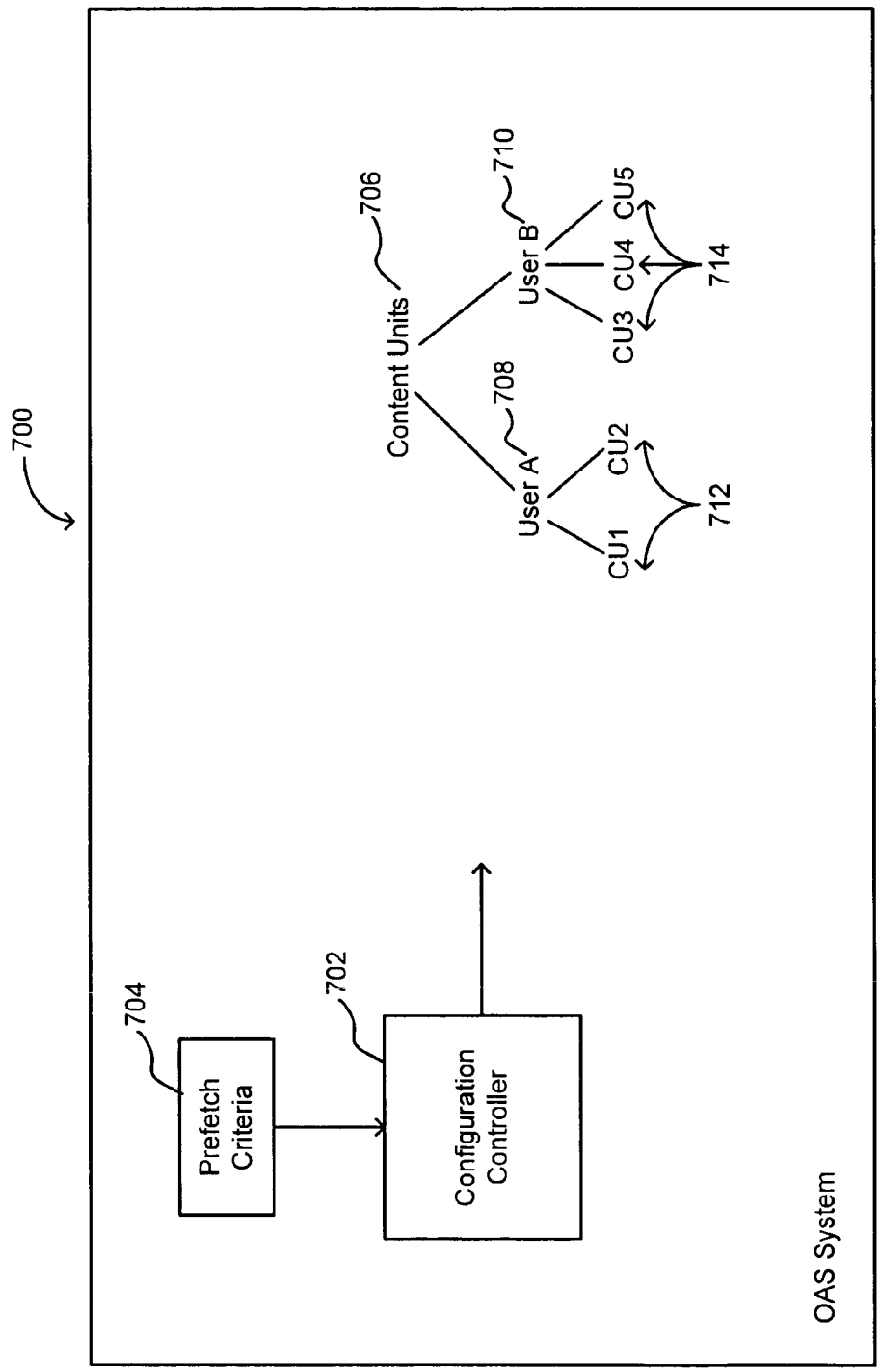
FIG. 7 is a block diagram of an OAS system that includes a controller to configure content units stored thereon in accordance with at least one prefetch criteria in accordance with one embodiment of the present invention.

FIG. 7 shows one illustrative configuration of an OAS system 700 that employs a configuration controller 702 that considers one or more prefetch criteria 704 when configuring the storage of content units in accordance with this embodiment of the present invention. In the illustration shown in FIG. 7, one of the prefetch criteria used by the configuration controller 702 to organize content units stored on the OAS system 700 is the identity of a user that stores the content units, and the configuration controller 702 organizes the content units using a file system architecture. As indicated above, it should be appreciated that the embodiment of the invention that organizes content units based upon one or more prefetch criteria is not limited in this respect, and that any prefetch criterion or set of criteria can be employed. In addition, any type of logical construct can be used to organize the content units according to at least one prefetch criteria, in addition to or as an alternative to the use of a file system directory structure.

In the illustrative configuration shown in FIG. 7, the content units are stored in a file system having a root directory 706 entitled "content units," and sub-directories under the root are formed for each user, with a sub-directory 708 corresponding to a user "User A" and a sub-directory 710 corresponding to a user "User B." A pair of content units 712 are stored in the sub-directory 708 for User A and labeled CU1 and CU2. Similarly, three content units 714 are stored in the sub-directory 710 for User B and labeled CU3, CU4 and CU5. Thus, when a prefetch is to be performed for content units associated with a particular user (e.g., User A), the OAS system 700 can easily and efficiently locate them by simply searching for the content units in the associated sub-directory (e.g., sub-directory 708).

As discussed above, in accordance with one embodiment of the present invention, the time at which content units are stored to the computer system can be employed as a criterion evaluated by the prefetch policy. In accordance with one embodiment of the present invention, when the time stored to the system is used by the prefetch policy, content units can be stored to the OAS system in a time-based directory structure that organizes content units based upon the time at which they are stored. Examples of time based directory structure organizations are described in some of the applications listed in Table 1 (e.g., application Ser. No. 11/107,063, entitled "Methods And Apparatus For Retrieval Of Content Units In A Time-Based Directory Structure"), although the aspects of the invention relating to grouping content units based on time stored are not limited to using the time based directory structure techniques described in those applications, or to any other particular implementation technique.

It should be appreciated that the organizing of content units on an OAS system to group them according to a prefetch policy can be performed at any desired time. For example, in one embodiment, an operation can be performed to group together content units already stored on an OAS system. In addition, or alternatively, when a content unit is initially written to an OAS system, it can be stored in an appropriate grouping to satisfy one or more prefetch criteria. Thus, in accordance with one embodiment of the present invention, when a write operation is performed to an OAS system, the prefetch criteria can be evaluated (e.g., via the configuration controller 702 in FIG. 7) to determine where to logically group the received content unit. In addition to the prefetch criteria, information pertaining to the content unit may also be evaluated (e.g., the type of content, a source for the content unit, metadata associated with the content unit, etc.), depending on the type of prefetch criteria employed. In the example described above in connection with FIG. 7, each content unit is logically placed into only one grouping in accordance with the prefetch policy. However, it should be appreciated that one or more content units can alternatively be placed in two or more logical groupings in accordance with prefetch criteria to support different types of prefetching operations. In this respect, it is envisioned that prefetch operations based upon different prefetch criteria can be performed at different times (e.g., in response to a system administrator or otherwise) so that the content units on an OAS system may be grouped to support different types of prefetching operations.

It should be appreciated that when a content unit written to an OAS system does not conform to any of the groupings established in accordance with the prefetch policy, the content unit can be stored in any suitable location on the OAS system.

5. Prefetch Boundaries

It should be appreciated that at least some of the types of prefetching discussed above are different in kind from conventional prefetching operations, and may result in significant numbers of content units that satisfy particular prefetch criteria. Thus, in accordance with one embodiment of the present invention, one or more boundaries may be placed upon a prefetch operation.

As an example, consider a prefetch policy that provides a preference for prefetching content units that relate to a particular user, wherein the user is an institution that may have millions of content units stored on the OAS system. Thus, if the OAS system were to search for and provide to the cache layer all of the content units associated with the institutional user, significant resources on the OAS system and the communication medium coupling it to the cache would be expended in searching for and transferring all of the content units. In addition, much of this effort may go to waste because the cache may not be able to accommodate the large number of content units associated with the institutional user and may thrash in response to receipt of all of the content units provided in response to the prefetching operation. Thus, in accordance with one embodiment of the present invention, a boundary may be set on the total number of content units to be prefetched during any particular prefetch operation. This and/or other types of boundaries can be established in any suitable manner, as the invention is not limited in this respect. For example, the boundary may be settable by a system administrator and can be altered as desired.

In accordance with an alternate embodiment of the invention, rather than bounding a prefetch operation by the total number of content units to be prefetched, an alternate or additional boundary can establish a limit of the total volume of content that may be obtained in a single prefetch operation. As discussed above, content units can be of unknown and variable size. Thus, it may be desirable to limit the volume of content to be returned in response to a prefetch operation to a particular volume (e.g., the total volume of the cache or a smaller volume).

In accordance with an alternate embodiment of the invention, a time range during which content units were stored to the computer system may be used as a boundary on the prefetch operation, so that only content units stored during a specified time range may be considered as candidates for being prefetched. The time range can be established in any suitable manner, as this aspect of the present invention is not limited to any particular implementation technique. As one example, when one or more recent access requests have sought access to one or more content units stored to the computer system at a particular point in time, a prefetch boundary may be established so that only content units stored to the system within a specified window around that time (e.g., from a day before to a day after) may be considered as candidates for prefetching. Of course, this is simply one example, as the bounding of candidates for responding to a prefetch operation based on temporal considerations is not limited to any particular implementation techniques.

Any of the above-discussed techniques for bounding a prefetch operation (and/or any alternate bounding techniques) can be implemented separately, or any combination of two or more can be employed together, as the aspect of the present invention relating to bounding a prefetch operation is not limited in this respect.

Figure 8:
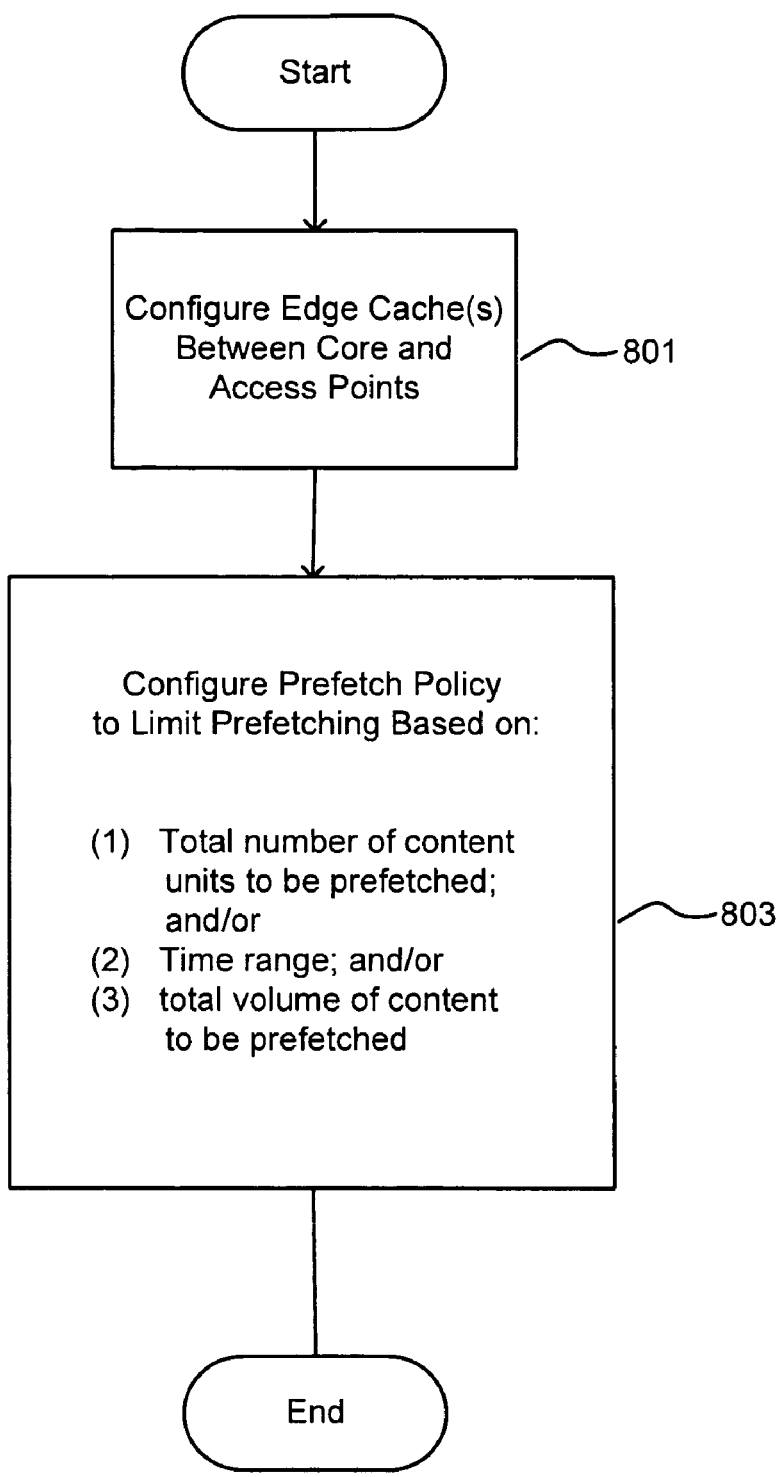
FIG. 8 is a flow chart of a process of configuring an edge cache to have prefetch policy that limits prefetching in accordance with one embodiment of the present invention.

As should be appreciated from the foregoing, one embodiment of the invention is directed to a process such as that shown in FIG. 8, wherein one or more edge caches are configured to be disposed logically between the core and one or more access points at act 801 (which can be implemented much like the act 450 in FIG. 4), and a prefetch policy can be configured to limit prefetching based upon any one or more of the following boundary criteria: (1) the total number of content units to be prefetched during a prefetch operation; (2) a time range during which content units were written to the computer system to establish them as candidates for prefetching; (3) the total volume of content to be prefetched during a prefetch operation.

6. Request Controlled Prefetching

In accordance with another embodiment of the present invention, prefetching can be controlled based upon an individual request for access to content. The enabling or disabling of prefetching in response to an individual access request can be implemented in any suitable manner, as the aspect of the present invention relating to request controlled prefetching is not limited to any particular implementation technique.

In accordance with one embodiment of the present invention, prefetching is user controlled. For example, a request to access a content unit may include user settable information (e.g., a flag) indicating whether prefetching is desired, and the system may perform prefetching or not based upon this information.

In an alternate embodiment of the present invention, request controlled prefetching can be performed by the system automatically based upon one or more criteria rather than being directly specified by a user in an access request. For example, if the prefetch policy searches for content units based upon some information associated with one or more recently accessed content units (e.g., the identity of a user, metadata associated with the content unit(s), the time at which the content unit(s) were stored, etc.), the prefetched content units may share some similarities to the recently accessed content unit(s). Thus, the system may employ one or more criteria to determine whether prefetching should be performed in response to a recent access request. For example, if a user is accessing a steady stream of a certain type of content units but issues one dissimilar access request (e.g., the user is making repeated access to MP3 files but interposes a solitary request for a photo), the user and/or the system may appreciate that no prefetching should be performed for that access request that is out of character with the others. Thus, if the user recognizes that the one or more access requests that are out of character with a set of access requests that surround it is to be made, and the system supports user-controllable prefetching, the user may turn off prefetching for those requests. In addition, or alternatively, in one embodiment the system need not rely upon user control, and may determine that prefetching should not be performed based upon a particular access request (e.g., based upon historical information of recent access requests as discussed above or otherwise).

As mentioned above, the aspect of controlling prefetching based upon an individual access request is not limited to the above-described examples and can be implemented in any suitable manner, as this aspect of the present invention is not limited to any particular implementation technique.

Figure 9:
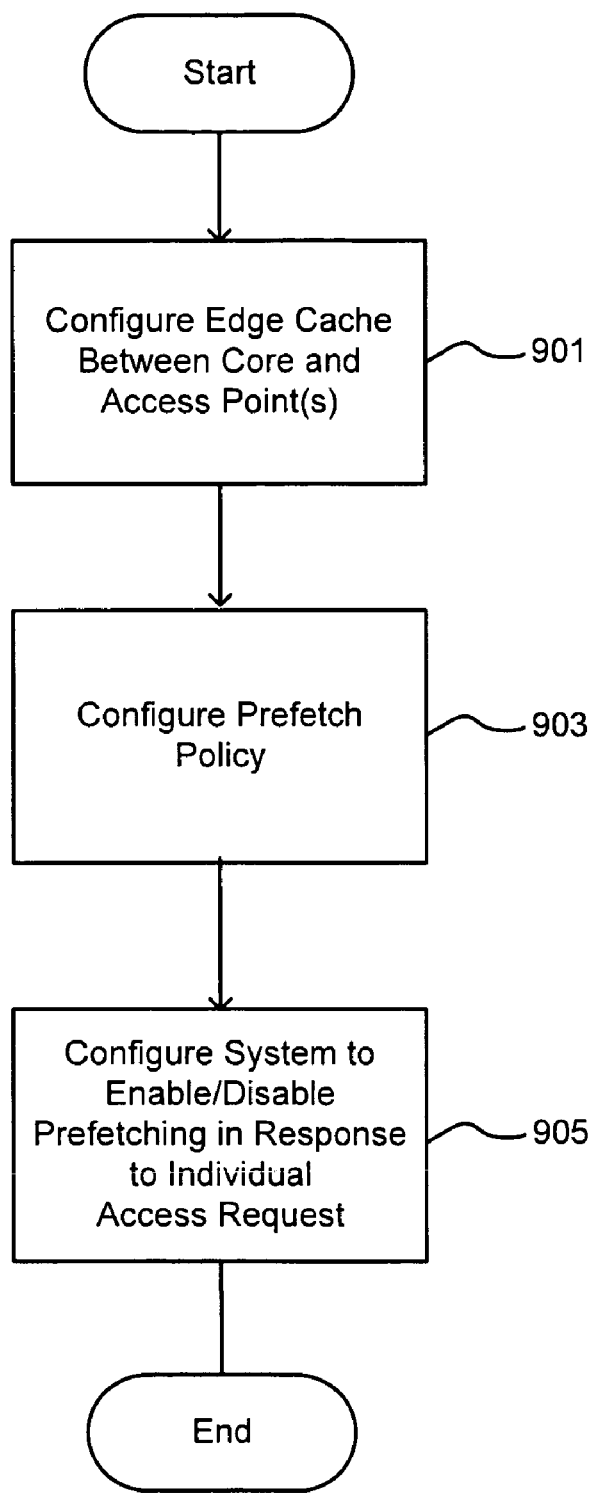
FIG. 9 is a flow chart of a process that configures an edge cache to enable/disable prefetching in response to individual access requests in accordance with one embodiment of the present invention.

As should be appreciated from the foregoing, in accordance with one embodiment of the present invention, a process such as that illustrated in FIG. 9 is executed wherein one or more edge caches are configured between the core and one or more access points in act 901, a prefetch policy for the edge cache(s) is configured in act 903, and the system is further configured in act 905 to enable/disable prefetching in response to an individual access request.

7. Cache Staging Techniques

While the use of an edge caching layer can provide performance improvements as discussed above, it should be appreciated that when an access request for a content unit misses in the cache, the time that it takes to determine that a miss has occurred and to request the content unit from the core can add additional latency that can impact performance. In accordance with one embodiment of the present invention, cache staging techniques can be employed to minimize the impact of any latency due to the edge caching layer.

Applicants have appreciated that the impact of the latency introduced by the edge caching layer seeking to locate a requested content unit (e.g., anywhere within the entire edge caching layer or within one or more subdivided regions as discussed above) can vary for different sized content units. In this respect, the latency introduced by the edge caching layer can be a greater percentage of the access time for smaller content units than for larger units because the download time from the core can be shorter for a smaller content unit. Applicants have appreciated that for smaller content units, it may be desirable to limit the searching done in the edge caching layer before obtaining the content unit from the core, so that less latency is introduced by the edge caching layer for smaller content units that may miss in the edge caching layer. This can be implemented in any suitable manner, as the aspect of the present invention that evaluates the size of a requested content unit in controlling the searching in the caching layer and the staging of content units from the core can be implemented in any suitable manner.

In accordance with one embodiment of the present invention, when a requested content unit has not been found in the edge caching layer after expending a limited amount of resources, even if no definitive determination has been made that the requested content unit is not in the edge caching layer, a request can be issued to the core to stage the requested content unit to the edge caching layer so that it can be returned to the requesting edge device. In this manner, a limit is placed on the searching performed by the edge caching layer so that in the event that the content unit is not in the edge caching layer, less latency is incurred in issuing the request to the core to stage the content unit to the edge caching layer than would have been incurred if the edge caching layer continued to search for the requested content unit until a conclusive determination was made that it was not present in the edge caching layer. The aspect of the present invention that determines or limits an amount of resources to be expended on searching in the edge caching layer depending upon the size of the requested content unit can be implemented in any suitable manner, as this aspect of the present invention is not limited to any particular implementation technique.

As one example, when a request is received for a content unit, a timer can be set that specifies an amount of time that the edge caching layer will search for the requested content unit, and upon the expiration of that time limit a request can be issued to the core to stage the requested content unit to the edge caching layer.

Alternatively, in an embodiment wherein the edge caching layer is implemented as a distributed system with multiple caching servers, the number of caching servers that may search for a requested content unit in response to a request can be varied depending upon the size of the content unit. This can be done in any of numerous ways. For example, if a particular caching server receives an access request for a content unit for which limited searching is to be performed, it may search for the content unit locally but not communicate with any other caching server(s) to determine whether they store the requested content unit.

As a further example, if the object locating technique employed by the edge caching layer identifies a number of potential content units as candidates for meeting a request, a limit can be placed on the number of those candidates that is actually evaluated, and a request can be issued to the core to stage the content unit to the edge caching layer if the requested content unit is not found after evaluating that limited number of candidates.

The implementation techniques described above are merely examples, as other techniques can be employed for limiting the resources expended by the edge caching layer so that it can request the staging of a content unit from the core before reaching a definitive determination that the content unit is not stored in the edge caching layer.

It should be appreciated that the aspect of the present invention that evaluates the size of a requested content unit in determining the amount of resources to expend in searching for the requested content unit in the caching layer is not limited to dividing potential content units into only two groups (i.e., small and large), but can divide the content units into any number (e.g., two or more) of categories, with progressively more resources being expended on searching in the caching layer for progressively larger content units. It should be appreciated that the particular size(s) of content unit(s) that establish the boundary between one category and another can be selected in any suitable manner, as the aspect of the present invention that performs size-dependent searching of the caching layer is not limited in this respect.

It should be appreciated that by requesting that a content unit be staged from the core prior to making a definitive determination that it is not already stored in the edge caching layer, circumstances may arise wherein a content unit requested from the core already resides in the edge caching layer. In such a circumstance, the content unit can simply be placed into the caching layer so that multiple copies of the content unit can be stored therein. In accordance with one embodiment of the present invention, the edge caching layer can implement a process designed to eliminate redundant cache entries. Such a process can, for example, run in the background so as to not impact the performance of any particular access request. However, the present invention is not limited to employing such a process, and in an alternative embodiment redundant copies can be allowed to remain in the edge caching layer.

In accordance with yet another alternate embodiment, when a request is issued to the core to stage a content unit to the edge caching layer without the edge caching layer having made a definitive determination that the content unit is not already stored in the edge caching layer, the content unit can be provided to the requesting edge device without storing it in the caching layer.

In accordance with another embodiment of the present invention, for some or all content units, the searching for a requested content unit in the caching layer can be performed in parallel with a request issued to the core to stage the content unit to the caching layer so as to further minimize any latency due to the caching layer. It should be appreciated that issuing requests to the core to retrieve content units that already may be stored in the caching layer can consume processing resources for the core, as well as bandwidth of the communication path between the core and the edge caching layer. Therefore, in accordance with one embodiment of the present invention, the issuing of a request to retrieve a content unit in parallel with the edge caching layer searching for the content unit can be limited to a subset of requested content units based on any desired criteria (e.g., only for smaller content units). It should be appreciated that requesting a content unit from the core prior to reaching a definitive determination that the content unit is not stored in the edge caching layer can result in duplicate cache entries which can be allowed to remain in the edge caching layer or can be addressed in any of the ways discussed above.

In accordance with the embodiment of the present invention that employs size-dependent searching in the caching layer, it may be desirable to have the request for a content unit provide information about the size of the content unit. In accordance with one embodiment of the invention, the size information can be provided in the unique identifier used to identify a content unit. The size information can take any suitable form, as the present invention is not limited in this respect. For example, the information can specify the actual size of the content unit. Alternatively, the content units can be divided into categories based upon size and the information provided with the request can identify the category, or any other suitable technique can be employed.

8. Illustrative Implementations

Figure 10:
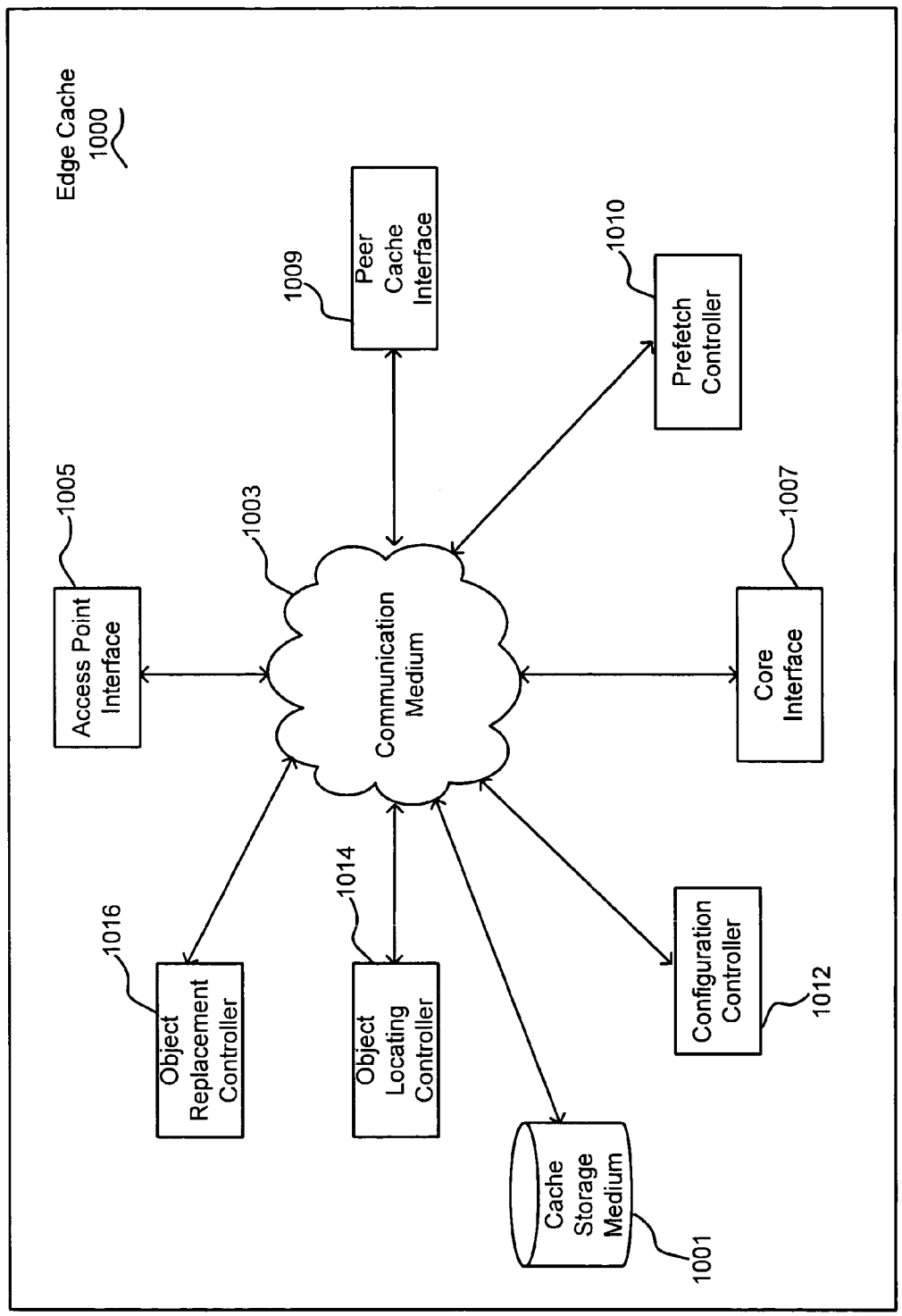
FIG. 10 is an illustrative implementation of an edge cache in accordance with one embodiment of the present invention.

As discussed above, the caching techniques described herein can be implemented in any suitable manner, as the aspects of the present invention described herein are not limited to any particular implementation techniques. An illustrative implementation of an edge cache 1000 is shown in FIG. 10. However, it should be understood from the foregoing that all embodiments of the present invention are not limited to employing an edge cache having all of the functionality illustrated in FIG. 10.

The edge cache 1000 comprises a cache storage medium 1001 on which content units stored in the edge cache can be stored, a number of functional units described below, and a communication medium 1003 that enables communication among the functional components of the edge cache 1000 and the storage medium 1001 in the manner described herein.

As discussed above, the cache storage medium 1001 can take any suitable form, as aspects of the present invention are not limited in this respect. In accordance with one embodiment of the present invention, the cache storage medium 1001 can take the form of one or more hard disk drives that store content units in non-volatile storage, but not all embodiments are limited in this respect. When the edge cache 1000 is implemented on one or more servers (e.g., a caching server 300 as illustrated in FIG. 2), the cache storage medium 1001 may comprise storage that is resident on the same computer or computers as the other functional components of the edge cache 1000, or may be implemented on a separate storage device accessible to the computer(s) on which the functional components are implemented.

The communication medium 1003 can take any suitable form, as the aspects of the present invention described herein are not limited to an edge cache that allows for communication among its functional components in any specific manner. For example, when the edge cache 1000 is implemented on a solitary computer, the communication medium can be an internal bus or other communication medium to facilitate communication, whereas when the edge cache 1000 is implemented using two or more distributed computers, the communication medium can be any type of bus or networking architecture. In addition, as discussed further below, it should be appreciated that two or more of the functional components illustrated in FIG. 10 can be implemented on a single processor with software that programs the processor to perform the described functions, so that communication among the various functional units may be performed in software under the control of a single programmed processor.

The edge cache 1000 comprises an access point interface 1005 through which the edge cache 1000 conducts communication with one or more access points in the manner described herein. Similarly, the edge cache 1000 comprises a core interface 1007 to facilitate communications with the core (or alternatively a higher level caching stage in a multi-staged arrangement) in the manner described herein.

As described above, in some embodiments, an edge caching server may be arranged with other peer caching servers to implement the edge caching layer (e.g., in FIG. 1), a sub-region of the caching layer, or a caching stage in a multi-staged arrangement. In accordance with some of those embodiments, communications may take place between two or more caching servers for various reasons (e.g., to determine collectively whether a requested content unit is a hit or miss in the caching layer, region or stage). Thus, in accordance with one embodiment of the invention, the edge cache 1000 comprises a peer cache interface 1009 through which such communications take place. Of course, the peer cache interface 1009 is optional, as it is contemplated that in some embodiments no communications among multiple caching servers need take place.

The edge cache 1000 further includes a prefetch controller 1010 that controls prefetching operations in any of the manners described above. It should be appreciated that the prefetching controller 1010 is optional, as not all embodiments of the invention described herein employ prefetching.

The edge cache 1000 of FIG. 10 further comprises a configuration controller 1012 which can perform any of the configuration operations for the edge cache described above (e.g., configuring the cache to limit the maximum number of content units that can be stored on it simultaneously). It should be appreciated that the configuration controller 1012 is optional, as it is contemplated that some of the embodiments described herein need not employ a configuration controller.

The edge cache 1000 further includes an object locating controller 1014 that can perform any of the functions described above for determining whether one or more content units referenced in an access request are located in the cache (e.g., on the cache storage medium 1001) and can return any located content units. When the edge cache 1000 cooperates in a distributed manner with other edge caches to determine a hit or miss, the object locating controller 1014 may optionally communicate with such other caches via the peer cache interface 1009.

Finally, the edge cache 1000 illustrated in FIG. 10 comprises an object replacement controller 1016 that, when content units stored on the cache storage medium 1001 are to be replaced to make room for new content units, controls the replacement process (e.g., by selecting content units to be replaced) in any of the ways discussed above.

As discussed above, an edge cache having the functional components shown in FIG. 10 can be implemented in any suitable manner (e.g., employing one or more processors to perform the described functionality), as the aspects of the present invention described herein are not limited to any particular implementation technique. In addition, it should be appreciated from the foregoing that a number of the functional blocks illustrated in FIG. 10 are optional, and that some implementations may not employ one or more of those functional blocks.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate | 10/731,603 | Dec. 9, 2003 |

TABLE 1-continued

| Title | Ser. No. | Filing Date |
|---|---|---|
| Selection Of A Physical Storage Location In A Data Storage System | | |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 2, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information | 11/021,378 | Dec. 23, 2004 |

TABLE 1-continued

| Title | Ser. No. | Filing Date |
|---|---|---|
| In A Hierarchical File System | | |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a computer system comprising a core, at least one cache and at least one edge device, the core comprising at least one object addressable storage system that stores a plurality of content units thereon and provides an object addressable interface that enables content units to be accessed via object identifiers, the at least one edge device being configured to access at least some of the plurality of content units, the at least one cache being disposed logically between the core and the at least one edge device and configured to temporarily store a subset of the plurality of content units, the method comprising an act of:

(A) configuring the computer system to have a prefetch policy that, during a prefetch operation, selects from among the plurality of content units at least one selected content unit to be prefetched to the at least one cache, the prefetch policy evaluating at least some of the plurality of content units as candidates for prefetching based upon at least one prefetch criterion, the prefetch policy further imposing a limit on at least one prefetch operation, the limit being selected from the group consisting of:

a total number of content units to be prefetched during the at least one prefetch operation;

a time range during which the at least some of the plurality of content units were stored to the computer system to qualify them as candidates for being prefetched during the at least one prefetch operation; and a total volume of content included in the prefetched content units during the at least one prefetch operation.

2. The method of claim 1, further comprising an act of:

(B) configuring the at least one cache to have an object addressable interface so that each of the subset of the plurality of content units temporarily stored on the at least one cache is accessible from the at least one cache via its object identifier;

wherein the at least one object addressable storage system is a content addressable storage system, and wherein at least one of the object identifiers is a content address generated at least partially based on the content of the content unit.

3. The method of claim 1, wherein the act (A) comprises an act of configuring the computer system to have a prefetch policy that imposes the limit on each prefetch operation.

4. The method of claim 1, wherein the act (A) comprises an act of configuring the computer system to have a prefetch policy that imposes the limit on the at least one prefetch operation, the limit being on a total number of content units to be prefetched during the at least one prefetch operation.

5. The method of claim 1, wherein the act (A) comprises an act of configuring the computer system to have a prefetch policy that imposes the limit on the at least one prefetch operation, the limit imposing the time range during which the at least some of the plurality of content units were stored to the computer system to qualify them as candidates for being prefetched during the at least one prefetch operation.

6. The method of claim 5, wherein the act (A) comprises an act of configuring the computer system to have a prefetch policy that, when the prefetch is performed in response to a request to access at least one of the plurality of content units that was stored to the computer system at a first time, imposes a limit on the time range during which the at least some of the plurality of content units were stored to the computer system to qualify them as candidates for being prefetched during the at least one prefetch operation, the time range being established relative to the first time.

7. The method of claim 1, wherein the act (A) comprises an act of configuring the computer system to have a prefetch policy that imposes the limit on the at least one prefetch operation, the limit being on the total volume of content included in the prefetched content units during the at least one prefetch operation.

8. At least one computer readable storage medium encoded with a plurality of instructions that, when executed, perform a method for use in a computer system comprising a core, at least one cache and at least one edge device, the core comprising at least one object addressable storage system that stores a plurality of content units thereon and provides an object addressable interface that enables content units to be accessed via object identifiers, the at least one edge device being configured to access at least some of the plurality of content units, the at least one cache being disposed logically between the core and the at least one edge device and configured to temporarily store a subset of the plurality of content units, the method comprising an act of:

(A) configuring the computer system to have a prefetch policy that, during a prefetch operation, selects from among the plurality of content units at least one selected content unit to be prefetched to the at least one cache, the prefetch policy evaluating at least some of the plurality of content units as candidates for prefetching based upon at least one prefetch criterion, the prefetch policy further imposing a limit on at least one prefetch operation, the limit being selected from the group consisting of:

a total number of content units to be prefetched during the at least one prefetch operation;

a time range during which the at least some of the plurality of content units were stored to the computer system to qualify them as candidates for being prefetched during the at least one prefetch operation; and a total volume of content included in the prefetched content units during the at least one prefetch operation.

9. The at least one computer readable storage medium of claim 8, wherein the method further comprise an act of:

(B) configuring the at least one cache to have an object addressable interface so that each of the subset of the plurality of content units temporarily stored on the at least one cache is accessible from the at least one cache via its object identifier; and wherein the at least one object addressable storage system is a content addressable storage system, and wherein at least one of the object identifiers is a content address generated at least partially based on the content of the content unit.

10. The at least one computer readable storage medium of claim 8, wherein the act (A) comprises an act of configuring the computer system to have a prefetch policy that imposes the limit on each prefetch operation.

11. The at least one computer readable storage medium of claim 8, wherein the act (A) comprises an act of configuring the computer system to have a prefetch policy that imposes the limit on the at least one prefetch operation, the limit being on a total number of content units to be prefetched during the at least one prefetch operation.

12. The at least one computer readable storage medium of claim 8, wherein the act (A) comprises an act of configuring the computer system to have a prefetch policy that imposes the limit on the at least one prefetch operation, the limit being on the total volume of content included in the prefetched content units during the at least one prefetch operation.

13. The at least one computer readable storage medium of claim 8, wherein the act (A) comprises an act of configuring the computer system to have a prefetch policy that imposes the limit on the at least one prefetch operation, the limit imposing the time range during which the at least some of the plurality of content units were stored to the computer system to qualify them as candidates for being prefetched during the at least one prefetch operation.

14. The at least one computer readable storage medium of claim 13, wherein the act (A) comprises an act of configuring the computer system to have a prefetch policy that, when the prefetch is performed in response to a request to access at least one of the plurality of content units that was stored to the computer system at a first time, imposes a limit on the time range during which the at least some of the plurality of content units were stored to the computer system to qualify them as candidates for being prefetched during the at least one prefetch operation, the time range being established relative to the first time.

15. At least one computer for use in a computer system comprising a core, at least one cache and at least one edge device, the core comprising at least one object addressable storage system that stores a plurality of content units thereon and provides an object addressable interface that enables content units to be accessed via object identifiers, the at least one edge device being configured to access at least some of the plurality of content units, the at least one cache being disposed logically between the core and the at least one edge device and configured to temporarily store a subset of the plurality of content units, the at least one computer comprising:

at least one processor programmed to implement a prefetch policy that, during a prefetch operation, selects from among the plurality of content units at least one selected content unit to be prefetched to the at least one cache, the prefetch policy evaluating at least some of the plurality of content units as candidates for prefetching based upon at least one prefetch criterion, the prefetch policy further imposing a limit on at least one prefetch operation, the limit being selected from the group consisting of:

a total number of content units to be prefetched during the at least one prefetch operation;

a time range during which the at least some of the plurality of content units were stored to the computer system to qualify them as candidates for being prefetched during the at least one prefetch operation; and a total volume of content included in the prefetched content units during the at least one prefetch operation.

16. The at least one computer of claim 15, wherein the at least one cache has an object addressable interface so that each of the subset of the plurality of content units temporarily stored on the at least one cache is accessible from the at least one cache via its object identifier; and wherein the at least one object addressable storage system is a content addressable storage system, and wherein at least one of the object identifiers is a content address generated at least partially based on the content of the content unit.

17. The at least one computer of claim 15, wherein the at least one processor is programmed to implement a prefetch policy that imposes the limit on each prefetch operation.

18. The at least one computer of claim 15, wherein the at least one processor is programmed to implement a prefetch policy that imposes the limit on the total number of content units to be prefetched during the at least one prefetch operation.

19. The at least one computer of claim 15, wherein the at least one processor is programmed to implement a prefetch policy that imposes the limit on the time range during which the at least some of the plurality of content units were stored to the computer system to qualify them as candidates for being prefetched during the at least one prefetch operation.

20. The at least one computer of claim 15, wherein the at least one processor is programmed to implement a prefetch policy that imposes the limit on the total volume of content included in the prefetched content units during the at least one prefetch operation.

* * * * *